United States Patent [19]

Shiba et al.

[11] Patent Number: 5,311,740
[45] Date of Patent: May 17, 1994

[54] HYDRAULIC POWER TRANSMISSION

[75] Inventors: Kenji Shiba; Ryota Ohashi; Kenichi Takada, all of Amagasaki, Japan

[73] Assignee: Kanzaki Kokyukoki Mfg. Co. Ltd., Amagakasi, Japan

[21] Appl. No.: 849,731

[22] Filed: Mar. 11, 1992

[30] Foreign Application Priority Data

| Mar. 11, 1991 | [JP] | Japan | 3-013413[U] |
| Mar. 13, 1991 | [JP] | Japan | 3-014395[U] |
| Nov. 18, 1991 | [JP] | Japan | 3-094403[U] |
| Nov. 21, 1991 | [JP] | Japan | 3-095542[U] |

[51] Int. Cl.$^5$ ............................................. F16D 31/02
[52] U.S. Cl. ......................................... 60/453; 60/488; 74/60
[58] Field of Search ............ 60/487, 488, 489, 491, 60/492, 453, 454; 91/504, 505; 92/12.2, 57, 71; 74/60; 417/269, 218

[56] References Cited

U.S. PATENT DOCUMENTS

| Re. 28,953 | 9/1976 | Rubenstein | 60/488 |
| 3,360,933 | 1/1968 | Swanson et al. | 60/489 |
| 3,699,678 | 10/1972 | Swanson et al. | 60/489 |
| 3,983,701 | 10/1976 | Jennings et al. | 60/488 X |
| 4,864,823 | 9/1989 | Ikejiri et al. | 60/487 X |
| 4,903,545 | 2/1990 | Louis et al. | |
| 4,914,907 | 4/1990 | Okada | |
| 4,932,209 | 6/1990 | Okada et al. | |
| 4,938,024 | 7/1990 | Matsuto et al. | 60/489 X |
| 4,979,583 | 12/1990 | Thoma et al. | |
| 4,986,073 | 1/1991 | Okada | |
| 5,031,403 | 7/1991 | Okada | |
| 5,069,037 | 12/1991 | Sakigawa et al. | 60/488 X |

Primary Examiner—Edward K. Look
Assistant Examiner—Hoang Nguyen
Attorney, Agent, or Firm—Sterne, Kessler, Goldstein & Fox

[57] ABSTRACT

A hydraulic power transmission including a compact external oil pressure takeoff apparatus which houses therein a hydrostatic transmission, and attaches thereto a charge pump. The transmission is capable of supplying operating oil and of taking out external oil pressure. Specifically, part of the discharge oil from the charge pump is adapted to be taken out from the housing so as to omit the need for an external takeout pump. An oil filter is disposed on the exterior of the housing, thereby facilitating maintenance of the hydraulic power transmission.

24 Claims, 33 Drawing Sheets

HYDRAULIC POWER TRANSMISSION

FIELD OF THE INVENTION

The present invention relates to the construction of a hydraulic power transmission having a hydraulic pump and a hydraulic motor in a single housing and to mounting a charge pump, an external oil pressure takeoff apparatus and a filter thereto.

BACKGROUND OF THE INVENTION

Hydraulic power transmissions in which a hydrostatic transmission (HST) is disposed in a housing and in which an oil pump is formed in the housing are well known in the art as disclosed in U.S. Pat. Nos. 4,914,907; 4,932,209; 4,986,073 and 4,903,545.

All the above-mentioned hydraulic power transmissions have been constructed to provide a counter-measure for leakage of operating oil from the HST so that the hydrostatic transmission takes in oil leaked into the housing for use in the closed fluid circuit within a central section of the HST.

The Applicant of the present invention has previously disclosed (in the U.S. Pat. No. 5,031,403) the provision of a charge pump for positively supplying operating oil to the hydrostatic transmission, disposed together therewith in a housing.

In the hydraulic power transmission in U.S. Pat. No. 5,031,403 when the oil in the housing is pressurized enough to be taken out the housing for actuating an actuator for lifting a working machine, a pump separate from the charge pump must also be disposed in the housing. Therefore, two pumps are required, increasing the expense to produce and the space required to contain the two pumps, resulting in a hydraulic power transmission that is large in sized as a whole.

Also in this previous transmission, an oil filter for filtering the oil in the housing when it is taken in by the charge pump is disposed together therewith in the housing. In order to periodically change the filter to avoid it being clogged, the housing needs to be dismantled, thereby increasing maintenance costs.

SUMMARY OF THE INVENTION

A first object of the invention is to utilize discharge oil discharged from the charge pump for the hydrostatic transmission disposed in the housing, thereby actuating the actuator for lifting a working machine or the like which is disposed exterior to the housing.

A second object of the invention is to attach an oil filter to an outer wall of the housing for filtering the oil in the housing for the hydrostatic transmission, when taken in by the charge pump which is disposed in the housing, thereby improving the maintenance required for changing the oil filter.

DESCRIPTION OF THE PREFERRED EMBODIMENT

Figure 33:
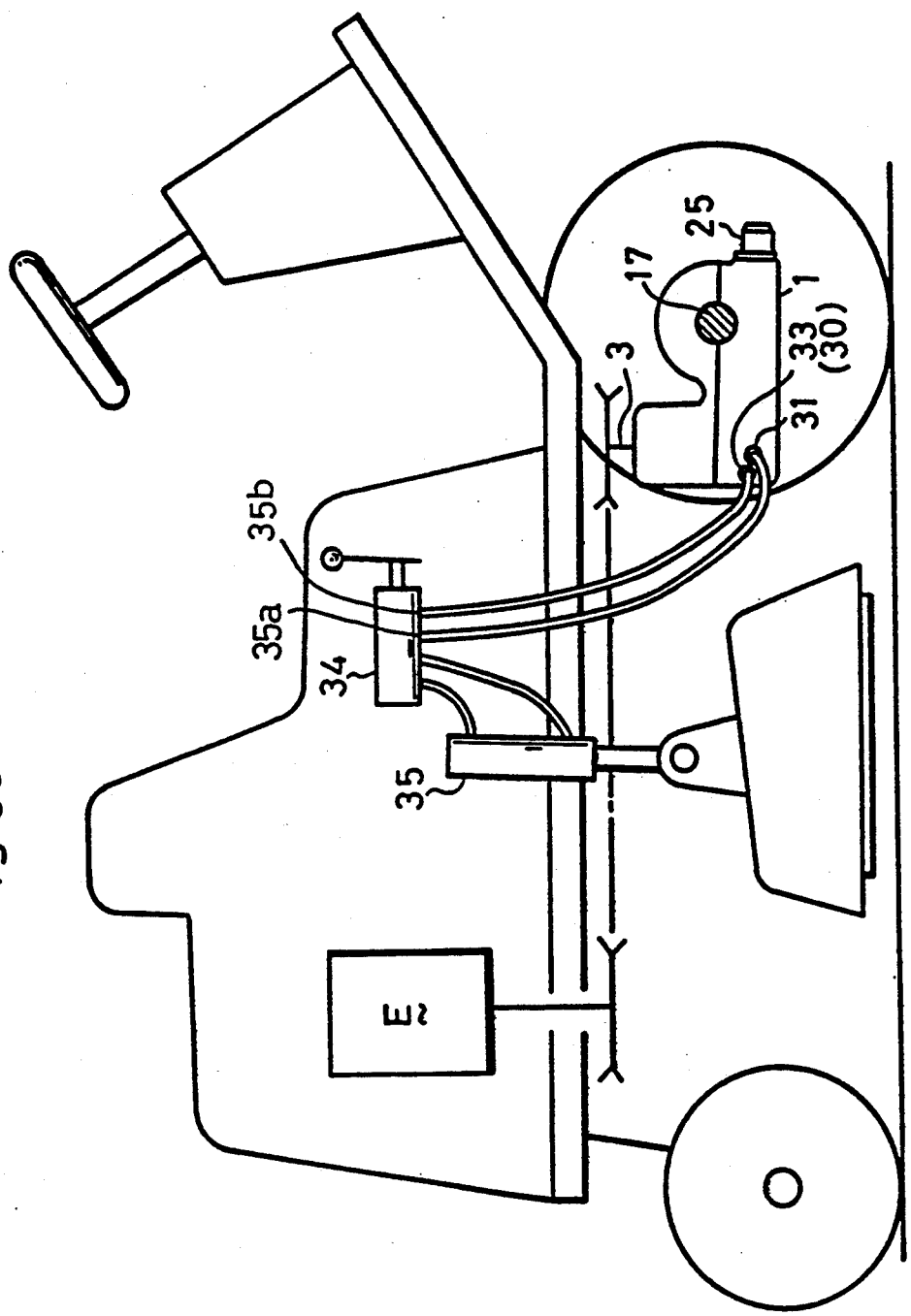
FIG. 33 illustrates an example of the application of the present invention applied to a working vehicle.

With reference to FIGS. 1-8, a first embodiment of an axle driving apparatus including a hydraulic power transmission according to the present invention is shown. In this embodiment, a housing 1 is split in half horizontally with respect to the longitudinal axis of axles 17. A center section 2, together with a charge pump casing 23 are fixed in an upper half of housing 1. Center section 2 is L-like-shaped when viewed in side elevation. A hydraulic pump P1 is mounted on the surface of the horizontal portion of center section 2, and a pump shaft 3 extends from the center of the horizontal portion. Pump shaft 3 projects at its utmost end thereof from housing 1 and is driven at its utmost end by an engine E through a pulley and a belt (FIG. 33). A cylinder block 5, containing pistons 9, is fitted onto pump shaft 3. The pistons 9 each abut at their utmost end with a movable swash plate 4. The slant angle of movable swash plate 4 is changeable by turning a speed-change shaft 6 which causes movable swash plate 4 to rotate to change discharge mass flow and the discharge direction. In addition, a spring for biasing the movable swash plate 4 to the neutral position is provided at shaft 6.

A hydraulic motor M is disposed perpendicular to pump P1 along the vertical portion of center section 2. A motor shaft 7 is supported at the center of the vertical portion. A cylinder block 8 which houses pistons 10 is fitted therein. The utmost ends of pistons 10 abut against a fixed swash plate 11. The suction side of hydraulic pump P1 and the discharge side of hydraulic motor M communicate with each other through oil passages 2a and 2b and a pair of kidney-shaped ports disposed within center section 2 forming a closed circuit. Oil pressure from the hydraulic pump drives the motor shaft 7.

A braking member 12 is fixed to motor shaft 7. Output gear 7a is also formed on motor shaft 7. Output gear 7a engages with a fixed gear 16 fixed onto an intermediate shaft 15 disposed in the housing 1. A gear 15a formed on intermediate shaft 15 engages with a ring gear 20 on a differential gear 19. Axles 17 are fitted into the differential gear 19 to drive wheels or a driving sprocket (not shown).

The above-mentioned axle driving apparatus is developed to be loaded on a working vehicle such as a tractor mower as shown in FIG. 33. The tractor may be provided at the center or the front thereof with a lawn mower blade attachment activated by an actuator 35 of the hydraulic power transmission system. Thus, the present invention provides an oil pressure source for actuating the actuator of the hydrostatic transmission as one component of the axle driving apparatus.

Figure 1:
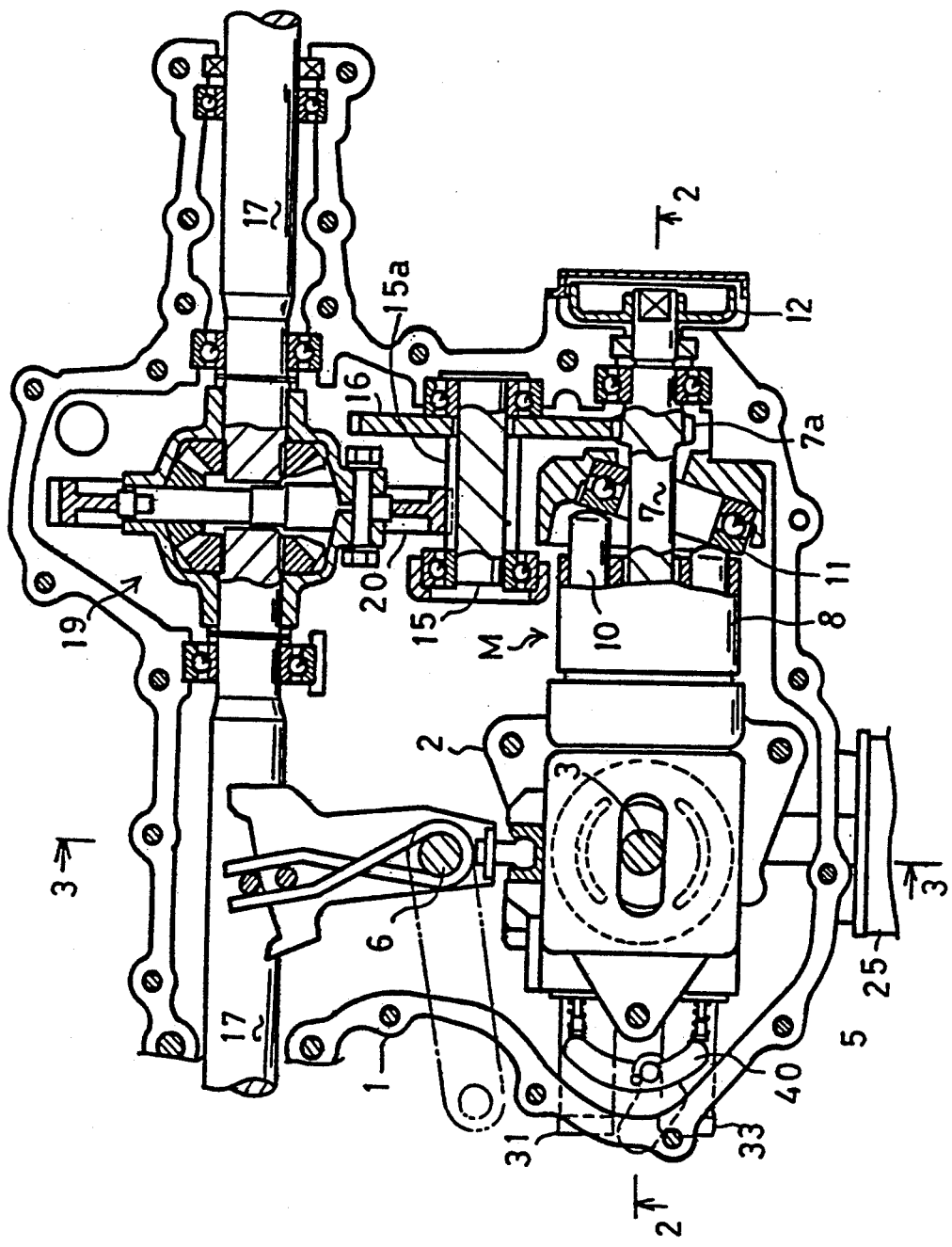
FIG. 1 is a partially sectional plan view of a first embodiment of an axle driving apparatus, in which an upper housing is removed.
Figure 2:
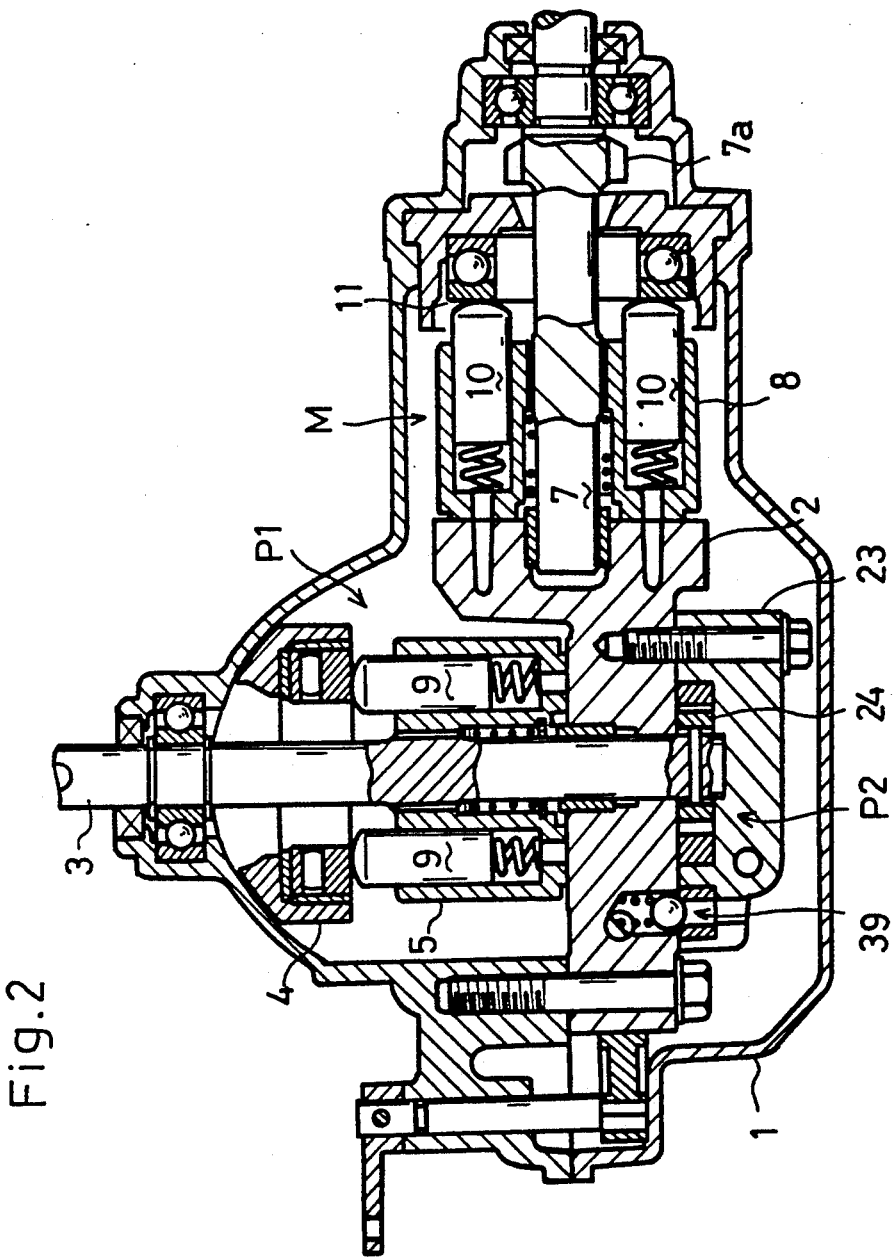
FIG. 2 is a sectional view taken on the line 2—2 in FIG. 1.
Figure 3:
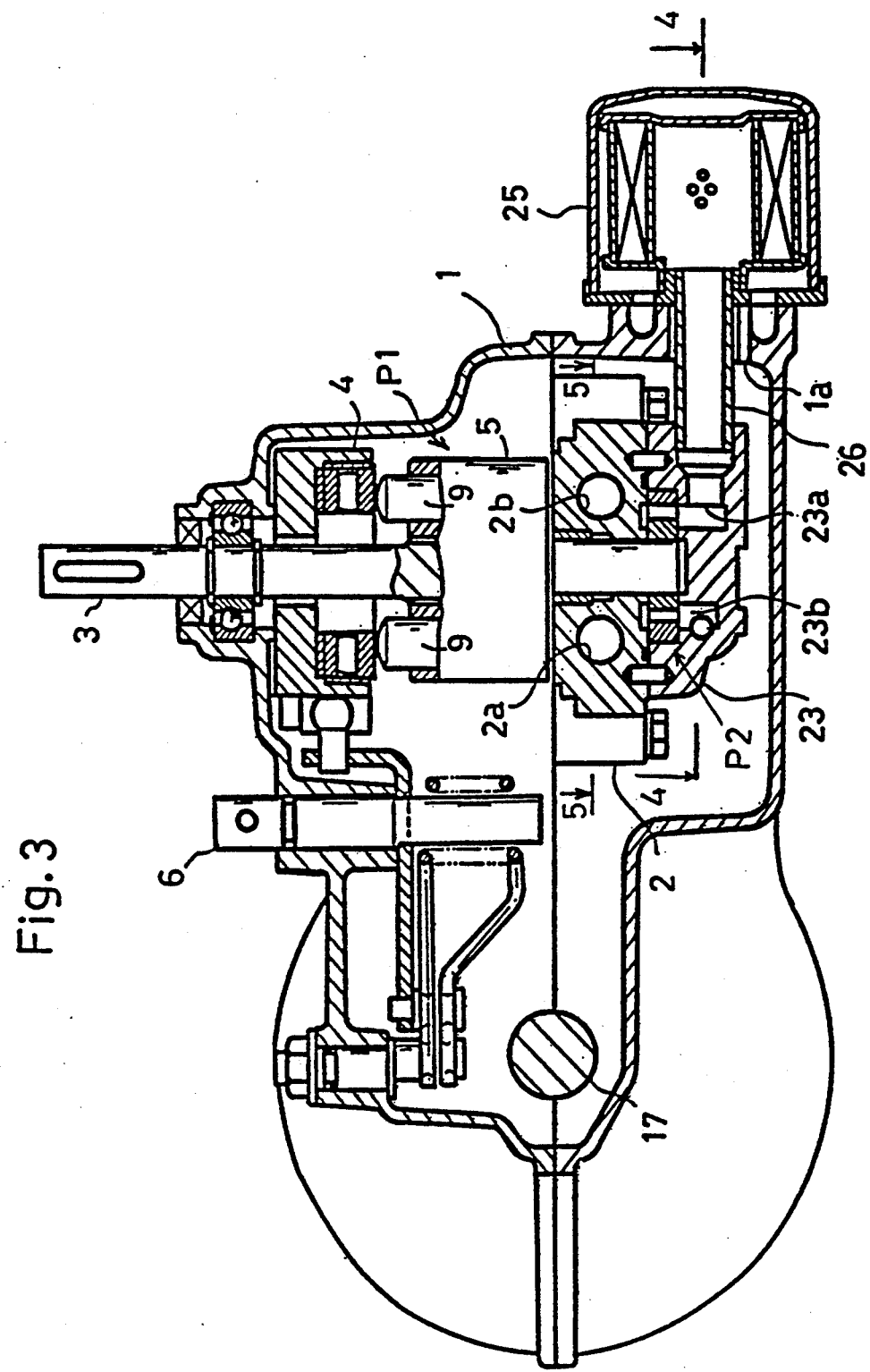
FIG. 3 is a sectional view taken on the line 3—3 in FIG. 1.

A charge pump casing 23 is joined to the lower surface of the center section 2, charge pump casing 23 is fixed to the upper half of housing 1. Pump shaft 3 perforates charge pump casing 23. A pump gear 24 is fixed to a lower end of pump shaft 3 so as to form a charge pump P2. A filter 25 for removing foreign objects from the operating oil taken into charge pump P2 is fixed to an outer wall of housing 1 as shown in FIG. 3. A suction port 1a is open at the outer wall of housing 1 to communicate with a suction port of a filter 25. A pipe member 26 is interposed between the discharge port of filter 25 and a suction port 23a, so that only the filter 25 is detachable from the housing 1 for facilitating maintenance of the filter.

Figure 4:
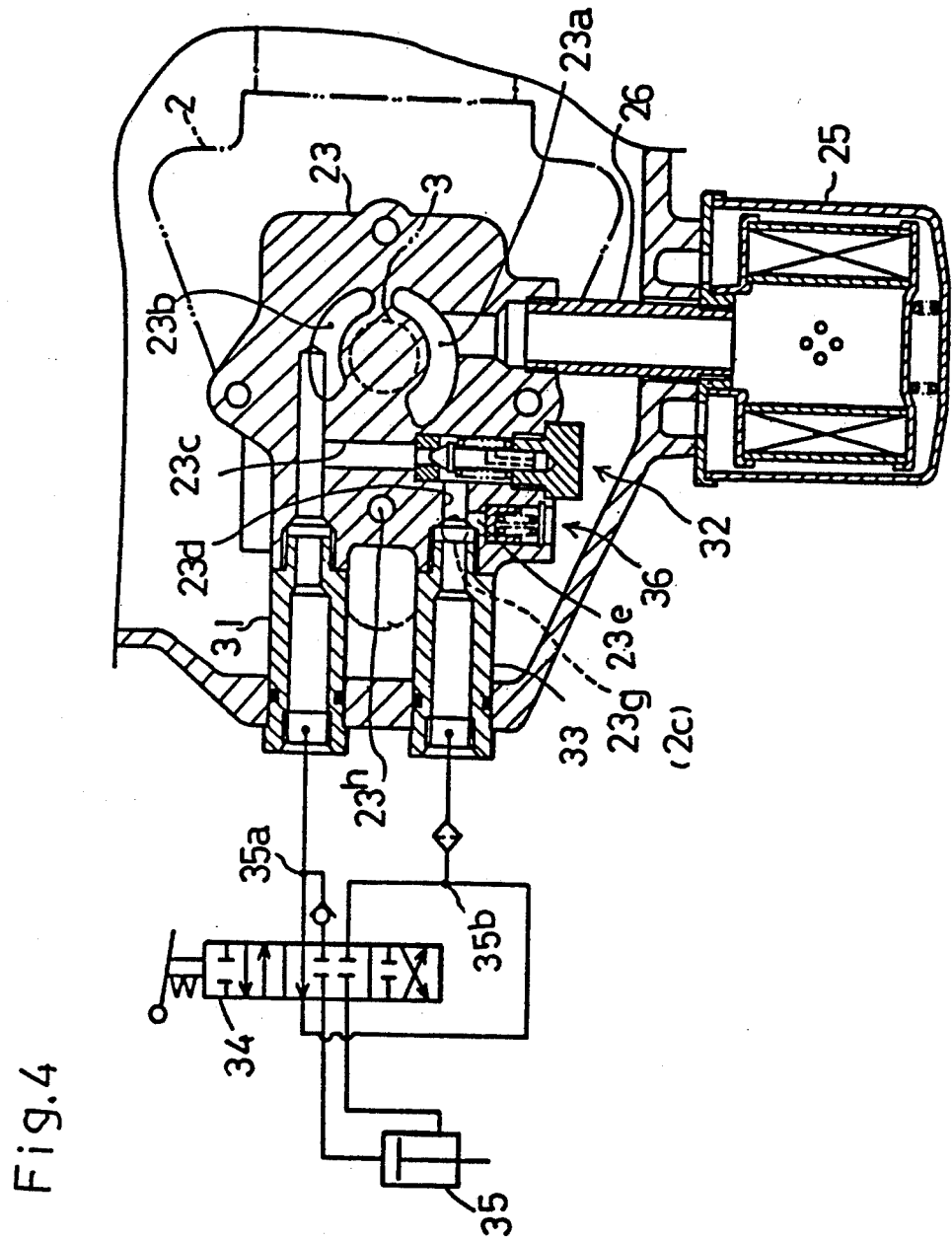
FIG. 4 is a sectional view taken on the line 4—4 in FIG. 3.
Figure 5:
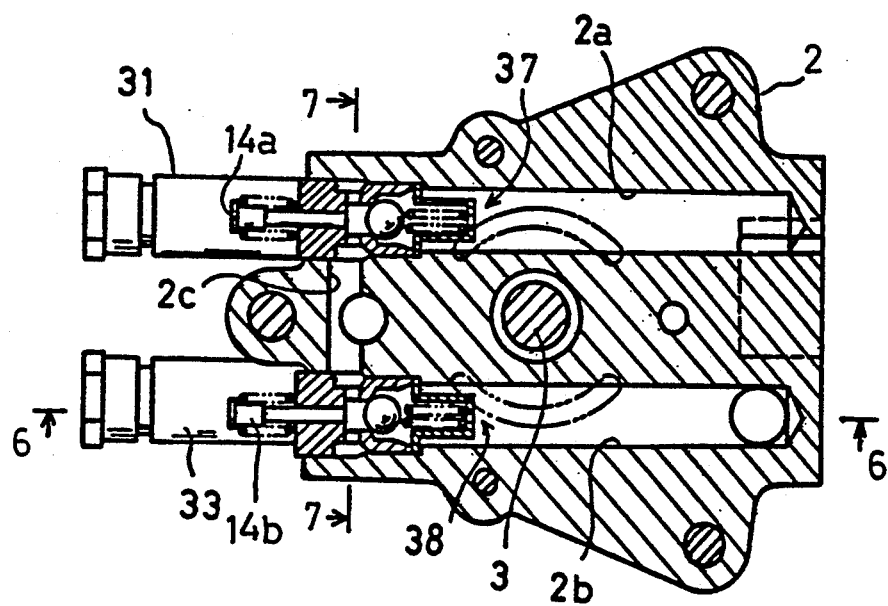
FIG. 5 is a sectional view taken on the line 5—5 in FIG. 3.
Figure 6:
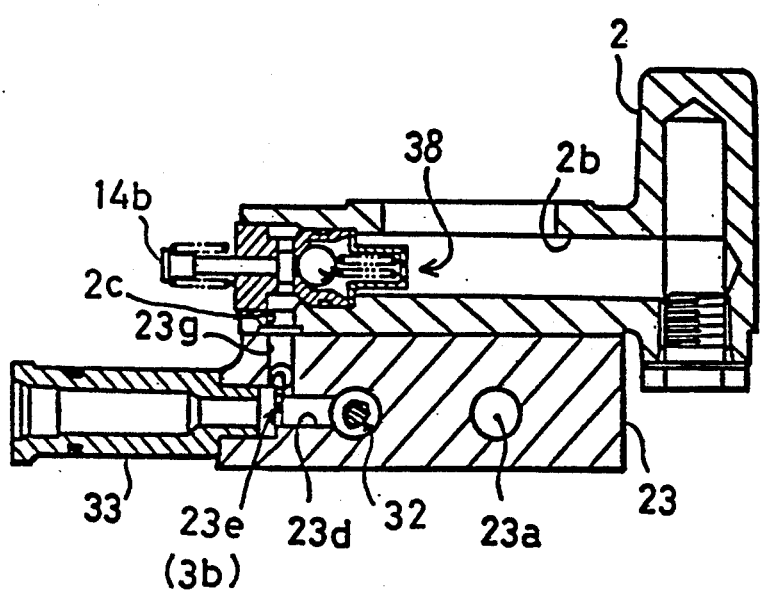
FIG. 6 is a sectional view taken on the line 6—6 in FIG. 5.

As shown in FIG. 4, a takeout side pipe member 31 is provided in charge pump P2 contained in housing 1. Pressure oil discharged from discharge port 23b may be taken out of housing 1 as operating oil for actuator 35. Pipe member 31 is long enough to project at one end from the outer wall of housing 1. The projecting end of pipe member 31 is formed into a connector.

Actuator 35 is a double-acting so as to be retractable by a directional control valve 34 of an open center system. A return side pipe member 33 is provided for returning oil from actuator 35 to actuator oil outlet 35b and then to charge pump casing 23. Pipe member 33 is long enough to project at one end thereof from the outer wall of housing 1. The projecting end of pipe member 33 is formed into a connector.

Oil passages 23c and 23d are provided in charge pump casing 23, so as to branch from the discharge port 23b to reach the return side pipe member 33. A relief valve 32 for adjusting the operating oil pressure for the actuator is interposed between both oil passages 23c and 23d. When the pressurized oil flowing in oil passage 23c is higher in pressure than the operating oil, relief valve 32 allows drained oil into the oil passage 23d. In addition, when the oil pressure is not taken out to the exterior, an external takeout port T1 and a return port T2 are by-passed by a pipe or the like.

Figure 7:
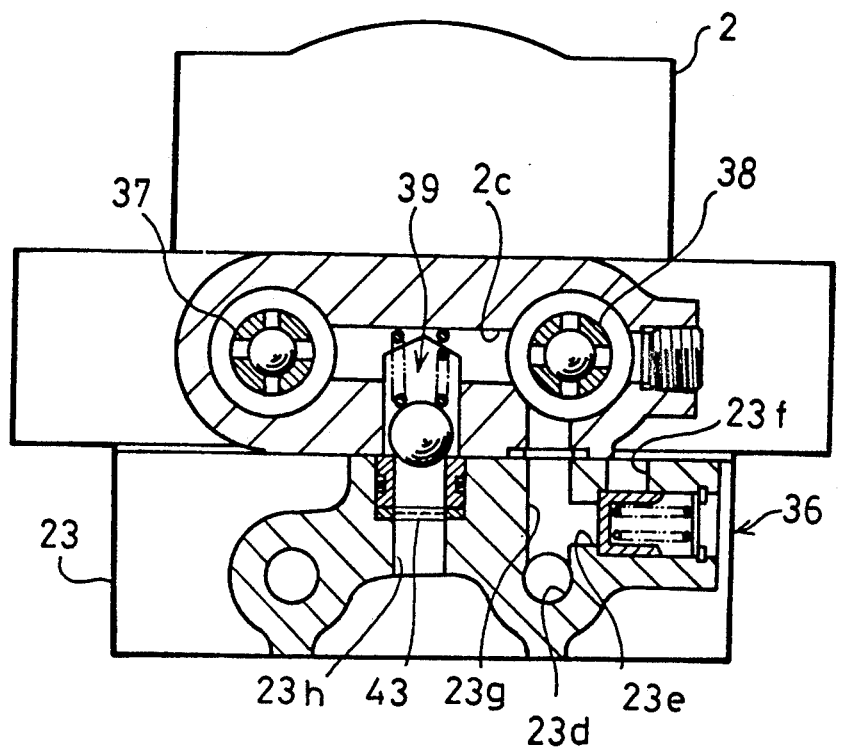
FIG. 7 is a sectional view taken on the line 7—7 in FIG. 5.
Figure 8:
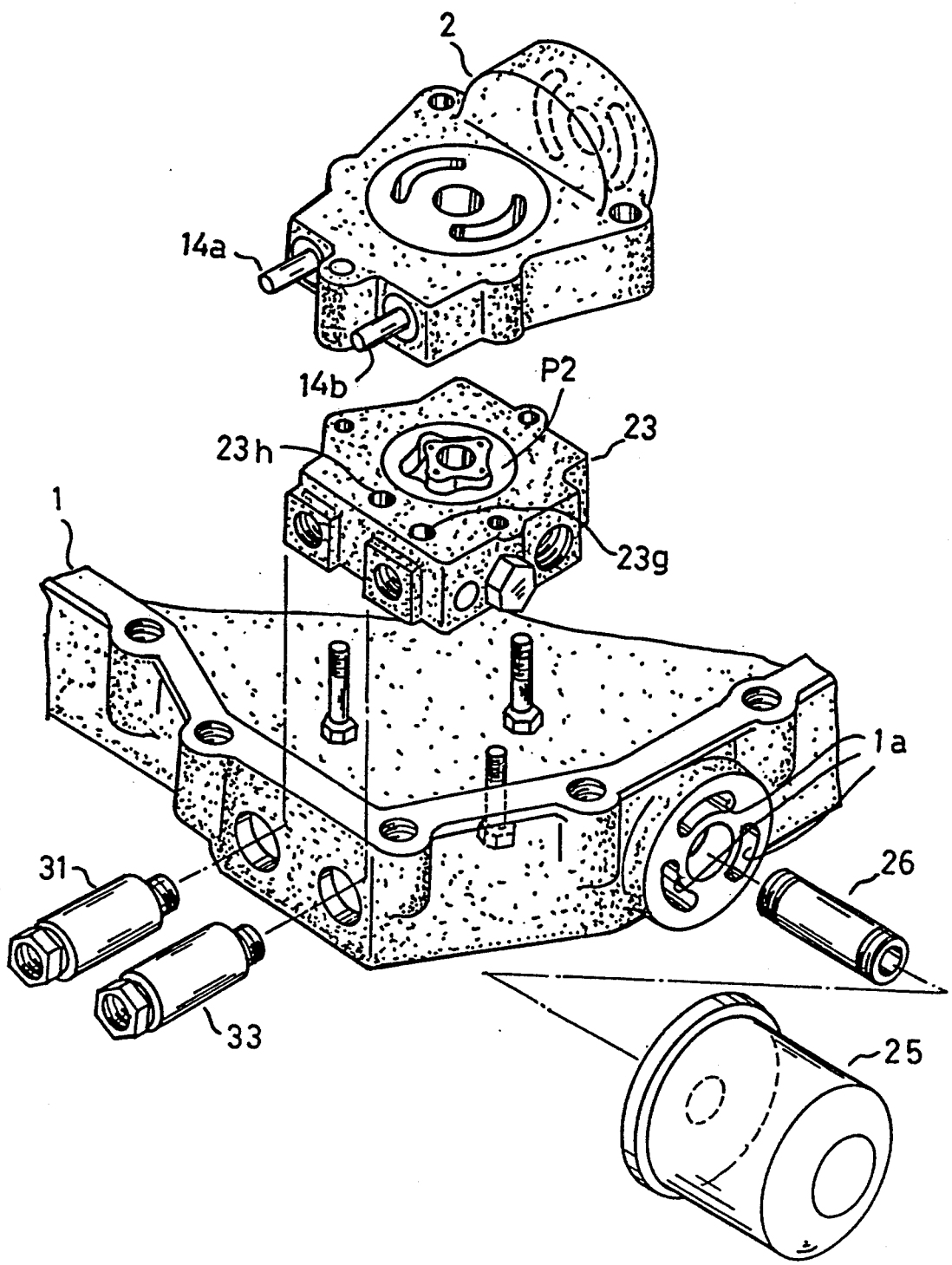
FIG. 8 is a perspective exploded view of a center section, a charge pump casing, a housing 1 and a filter 25 in part as in the embodiment of FIGS. 1 through 8.
Figure 9:
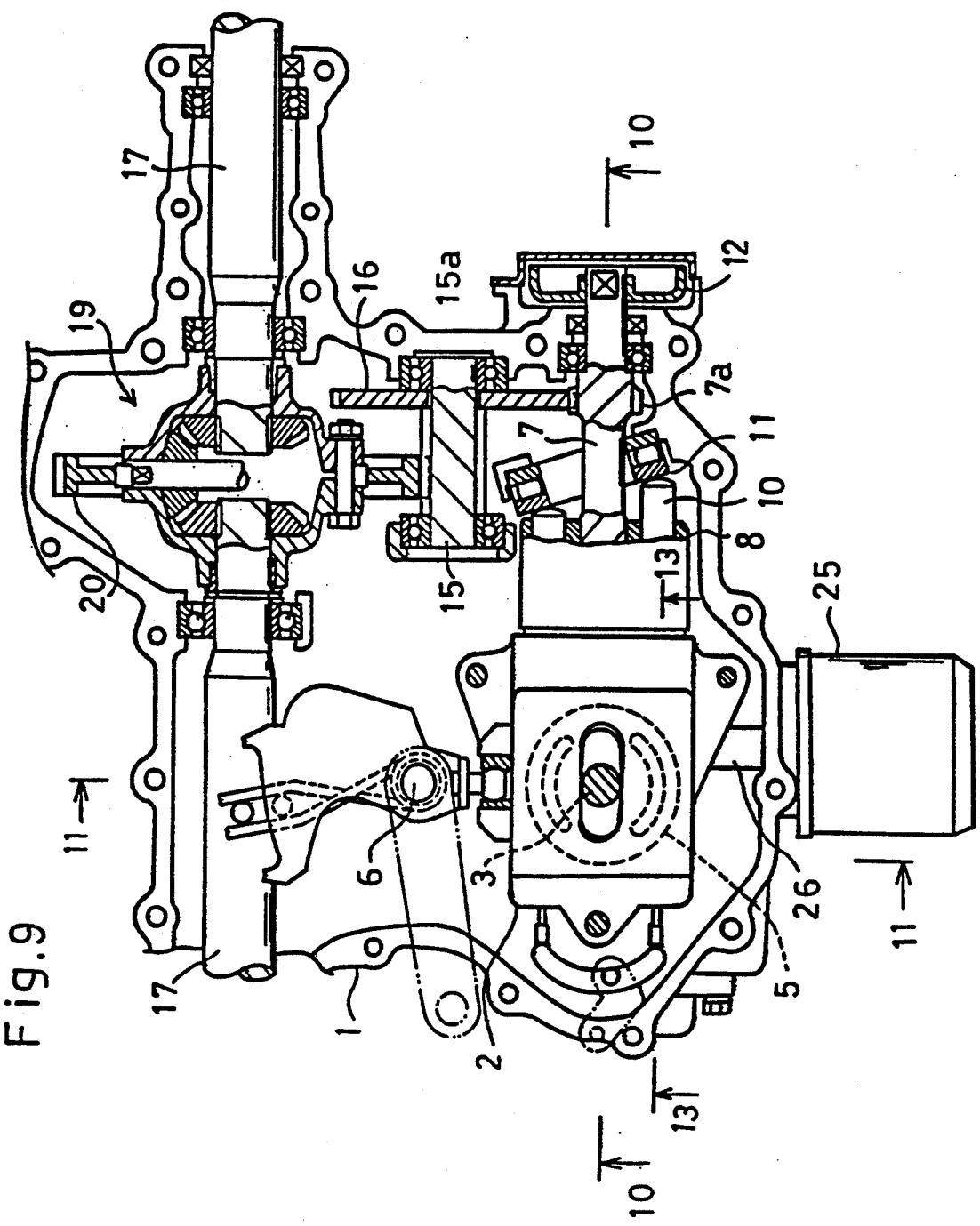
FIG. 9 is a partially sectional plan view of a second embodiment of the axle driving apparatus, in which the upper housing is removed.
Figure 10:
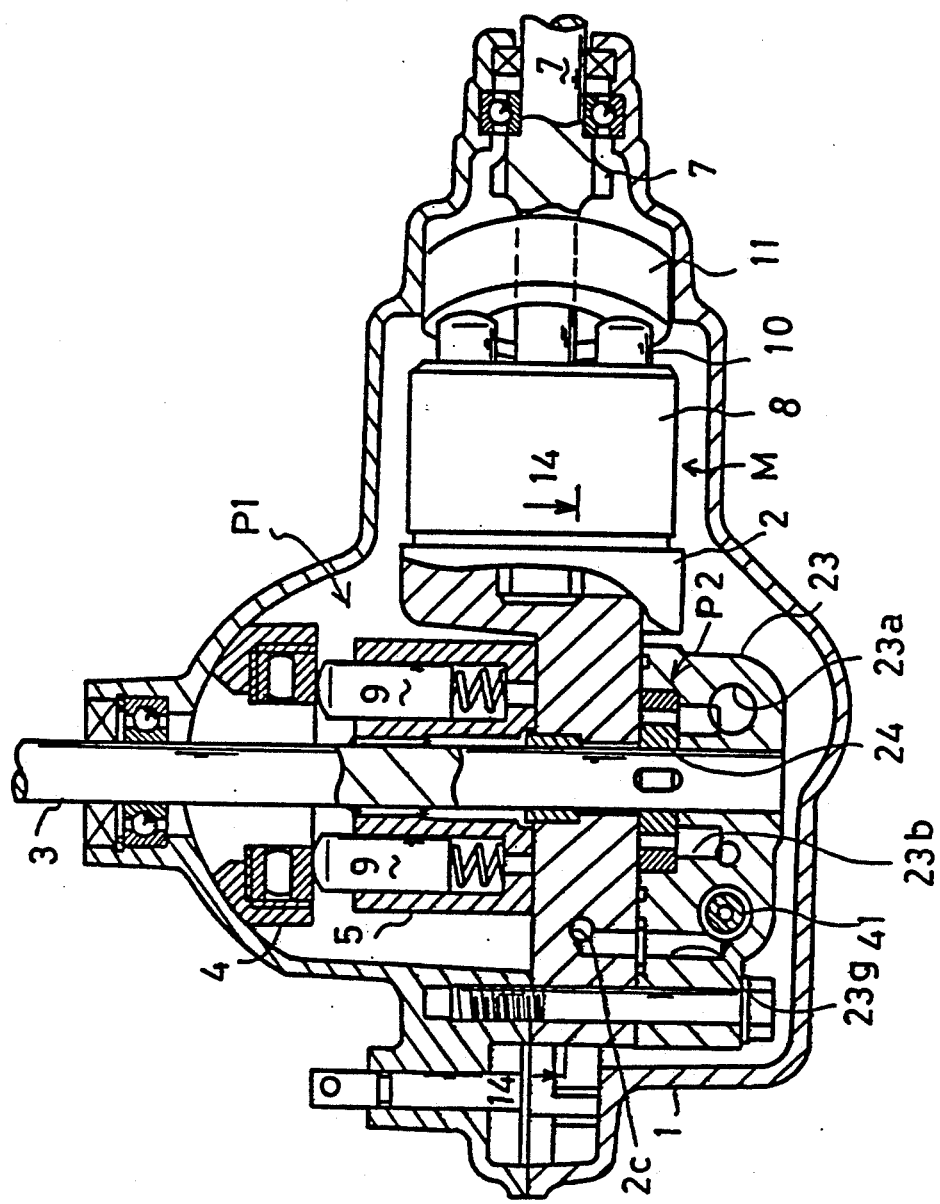
FIG. 10 is a sectional view taken on the line 10—10 in FIG. 9.
Figure 11:
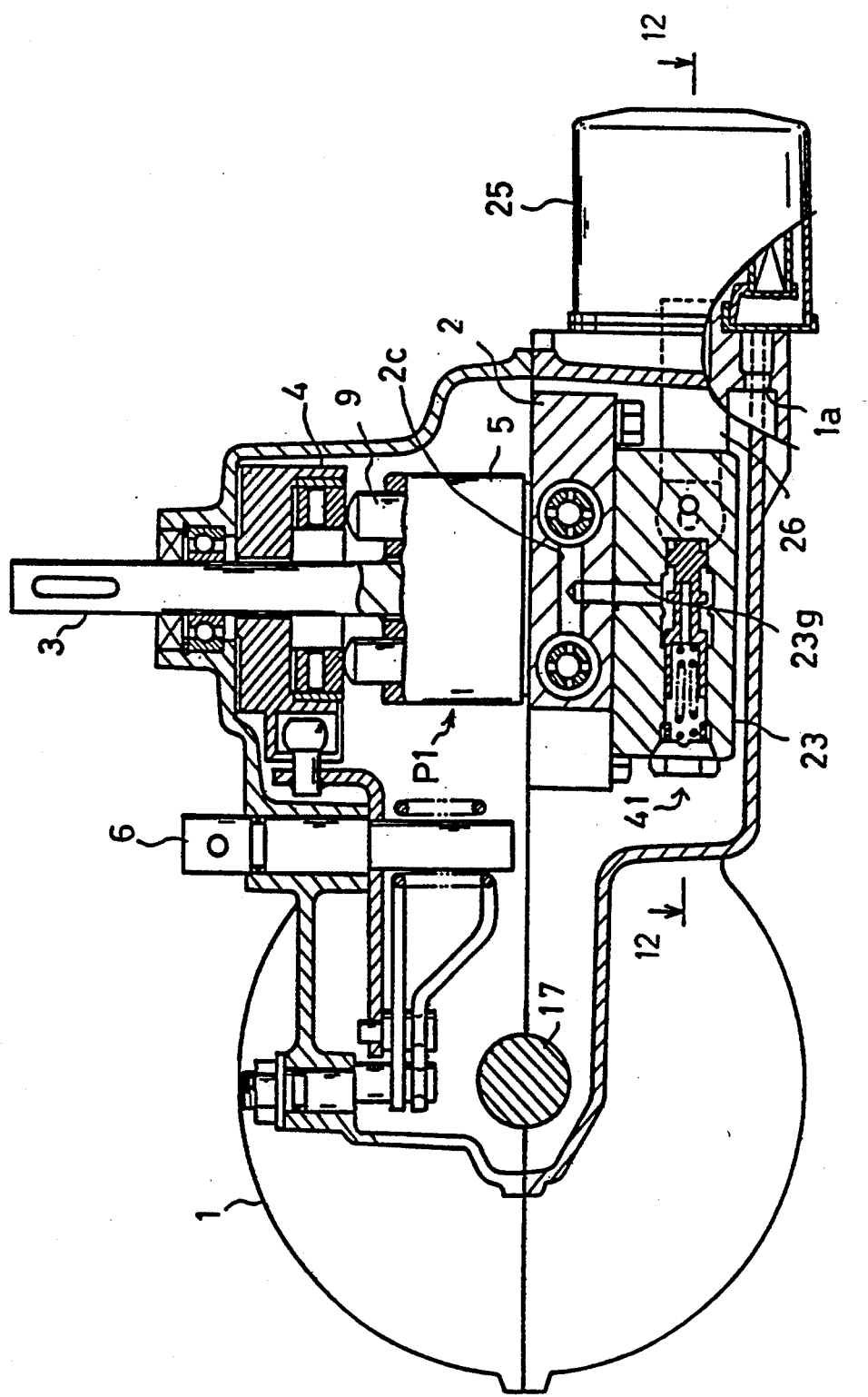
FIG. 11 is a sectional view taken on the line 11—11 in FIG. 9.
Figure 12:
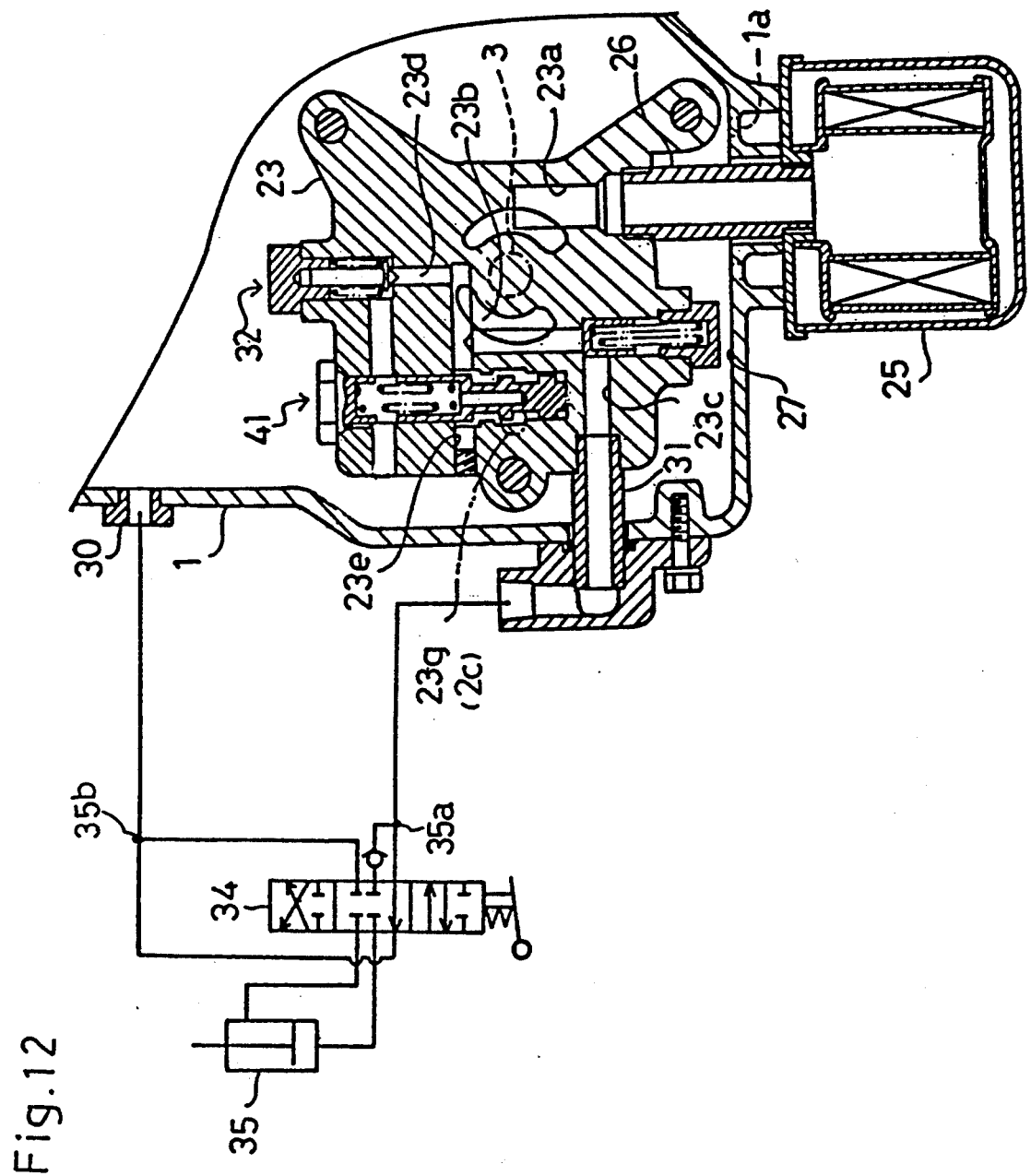
FIG. 12 is a sectional view taken on the line 12—12 in FIG. 11.
Figure 13:
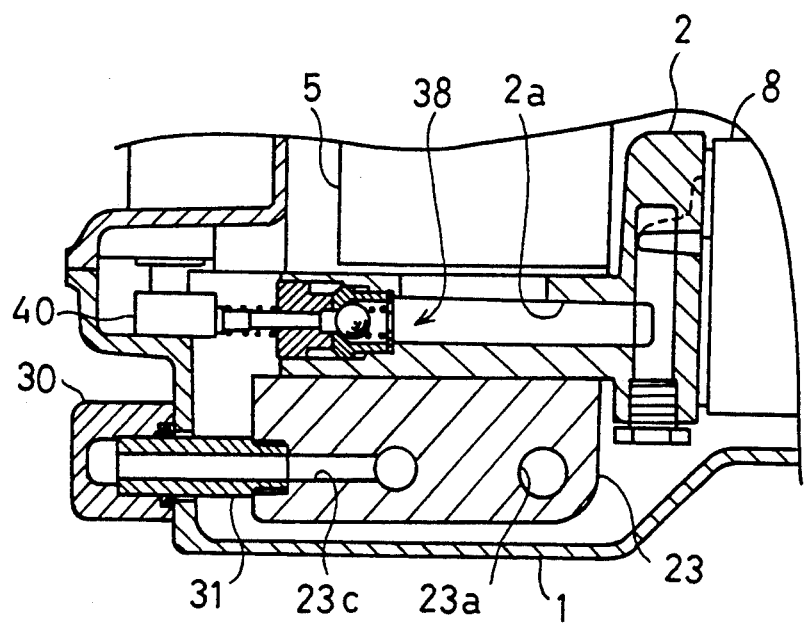
FIG. 13 is a sectional view taken on the line 13—13 in FIG. 9.
Figure 14:
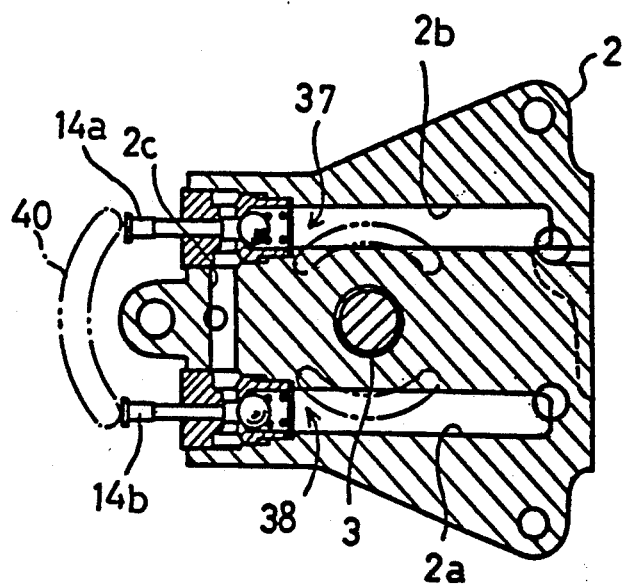
FIG. 14 is a sectional view taken on the line 14—14 in FIG. 10.
Figure 15:
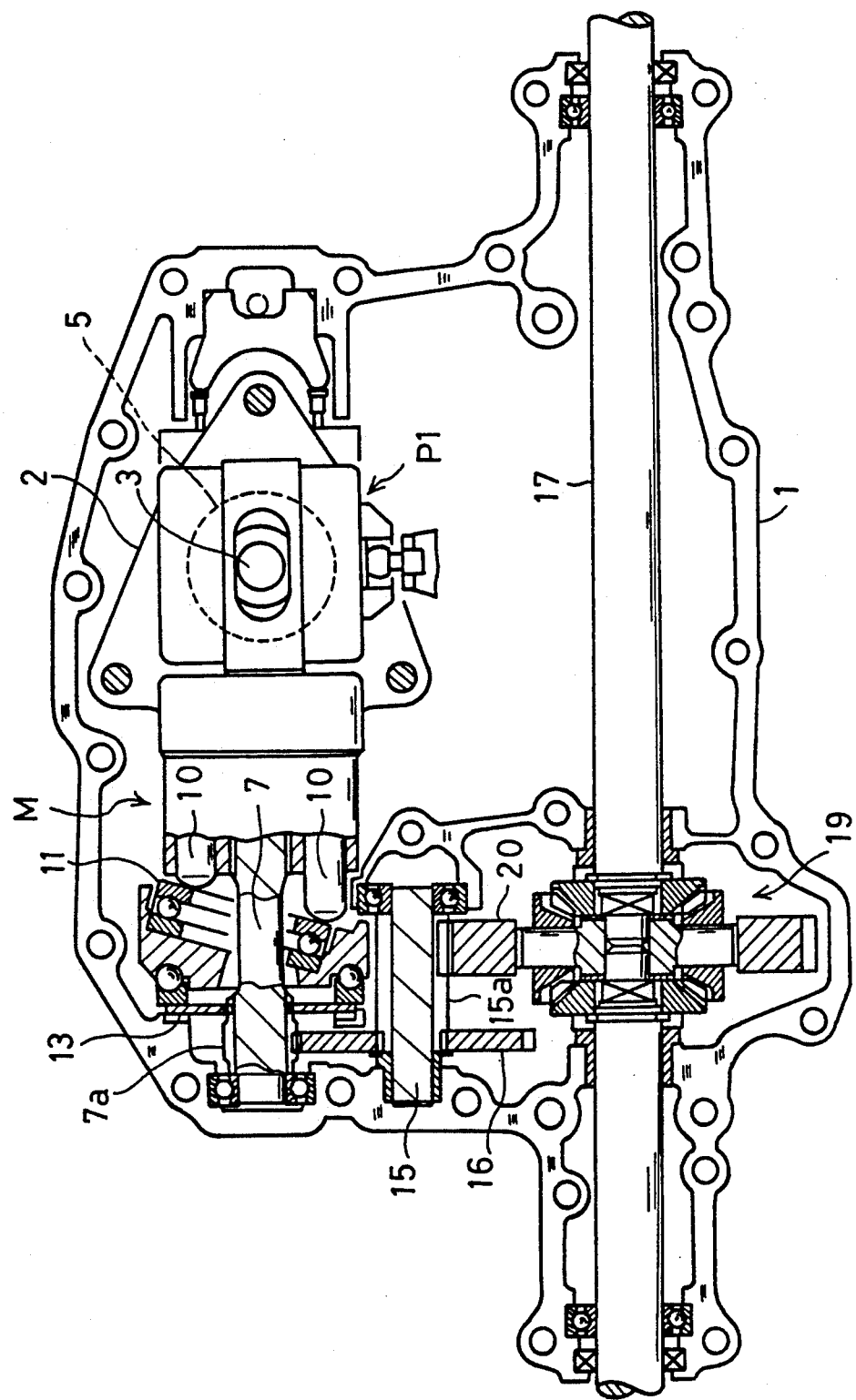
FIG. 15 is a sectional plan view of a third embodiment of the axle driving apparatus of the invention, in which the upper housing is removed.
Figure 16:
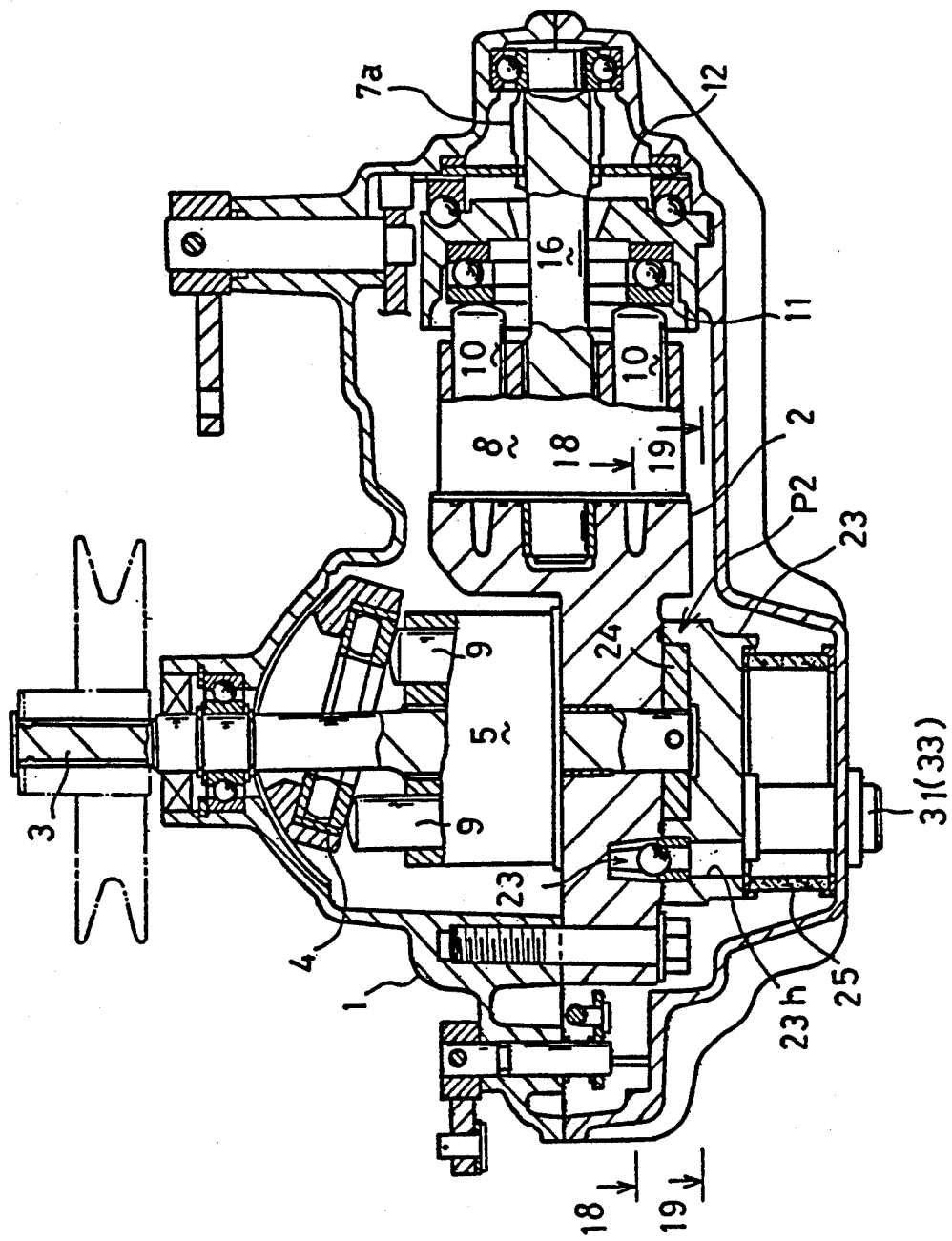
FIG. 16 is a sectional rear view of the third embodiment of the axle driving apparatus.

A charge oil pressure adjusting relief valve 36 is provided at an oil passage 23e communicating with oil passage 23d. A oil passage 23f is bored at the lower pressure side of relief valve 36, as shown in FIG. 7, to communicate with the interior of housing 1. When the pressure oil flowing in oil passage 23d becomes higher than the charge oil pressure, oil passage 23f is opened to discharge drain oil into housing 1. Also, the oil passage 23d communicates with an oil passage 23g for supplying pressure oil to the closed circuit of hydraulic pump P1 and hydraulic motor M. The oil passage 23g communicates with an oil passage 2c through the mutual junction surface. By-pass check valves 37 and 38 are provided at the ends of oil passages 2a and 2b to communicate with each other at the in-flow side thereof.

Oil passage 2c communicates with an oil passage 23h bored in the charge pump casing 23. Oil passage 23h communicates at an open end with the interior of housing 1 and is provided at the upper portion thereof with a self-suction check valve 39 and a filter 43. When the pressurized charge oil is not supplied to oil passage 2c because of trouble such as the failure of charge pump P2, check valve 39 is open to supply operating oil in the housing from self-suction check valve 39 to oil passage 2c.

By-pass check valves 37 and 38 are opened by depressing a release lever 40 so as to open the closed circuit of hydraulic pump P1 and hydraulic motor M, thereby enabling the hydraulic motor M to freely rotate.

In such a construction, when engine E is driven to rotate pump shaft 3, hydraulic pump P1 and charge pump P2 are driven. Pressure oil discharged therefrom is completely charged into the hydrostatic transmission from the return side pipe member 33 through the by-pass check valves 37 and 38. Relief valve 32 for operating oil adjustment does not operate when the directional control valve 34 is in neutral position. Oil of a pressure which is higher than that of the charge oil is discharged from actuator oil outlet 35b through open relief valve 36 into housing 1. When the directional control valve 34 is changed to the operating position, the pressurized oil is supplied to the actuator oil inlet 35a actuator 35 from discharge port 23b through takeout side pipe member 31. When actuator 35 is extended or retracted to reach the end of the stroke, relief valve 32 operates to discharge the drain oil through by-pass check valves 37 and 38, thereby enabling the oil pressure to be adjusted by relief valve 36.

In the case where a single acting actuator is operated, pressurized oil is fed into the cylinder, but during the cylinder stroke no return oil is charged into communication oil passage 2c due to the single action of the actuator. In such case, self-suction check valve 39 is open and the operating oil in housing 1 is taken in through a filter 43 and charged into oil passage 2c through open by-pass check valves 37 and 38.

Next, explanation will be given on the construction of a second embodiment of the invention in accordance with FIGS. 9 through 14, in which a hydrostatic transmission and an axle driving apparatus are one component and all are the same as those in the first-described embodiment, thereby eliminating the need for further explanation of both members.

In this embodiment, charge pump casing 23 is joined with the lower surface of center section 2. Pump shaft 3 is fixed to pump gear 24 in charge pump casing 23 to form charge pump P2. Filter 25, for feeding operating oil to charge pump P2, is fixed to an outer wall of housing 1. A suction port 1a is open at the side wall of the lower portion of housing 1 and communicates with a suction port of filter 25. A discharge port thereof is connected to a pipe member 26 provided at a suction port 23a of charge pump P2. The filtered oil is taken in suction port 23a of charge pump P2 through pipe member 26 and is discharged from discharge port 23b so as to open a resistance valve 27. The filtered oil then flows from an oil passage 23c to takeout side pipe member 31, whose end thereof is exposed to the exterior of housing 1 and is used as a connector to actuator oil inlet 35a.

Discharge port 23b communicates with oil passages 23d and 23e. A relief valve 32 for adjusting operating oil pressure for the actuator 35 is interposed in oil passage 23d. Pressure of the relief valve 32 is set higher than that of the resistance valve 27 so that when directional control valve 34 is changed over to expand the stroke end thereof, the actuator 35 and relief valve 32 operate to discharge drain oil into housing 1 through an oil passage 23f. Also, the return oil from actuator oil outlet 35b of actuator 35 is discharged into housing 1 through an oil port 30. On the other hand, a pressure reducing valve 41 is interposed in oil passage 23e. The pressure oil adjusted by relief valve 32 is reduced in pressure by pressure reducing valve 41 down to the charge oil pressure and flows from oil passage 23g to oil passage 2c of center section 2, whereby by-pass check valves 37 and 38 are open to supply pressurized oil into the closed circuit.

Next, explanation will ben given on the construction of a third embodiment of the invention, in accordance with FIGS. 15 through 22. In this embodiment, the combined hydrostatic transmission and axle driving apparatus are the same as those described in the first and second embodiments, thereby omitting further explanation of them. Further, relief valve 32 for adjusting the operating oil pressure of the actuator and relief valve 36 for adjusting the charge oil pressure provided at charge pump casing 23 are the same as those described above with regard to the first embodiment. Thus, a detailed description of them is also omitted. The portions of third embodiment which are different from the first embodiment are described below.

Figure 17:
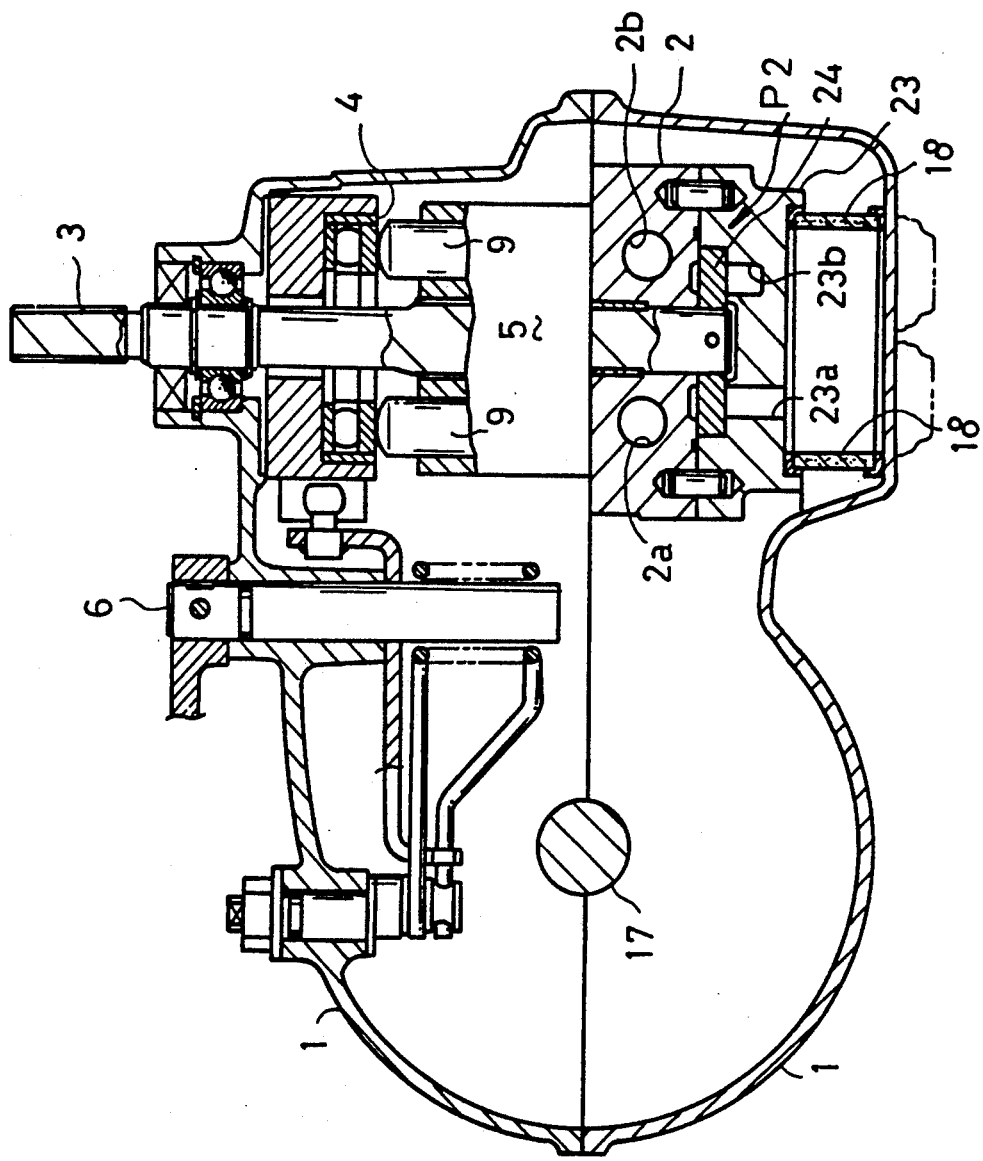
FIG. 17 is a sectional side view of the same.
Figure 18:
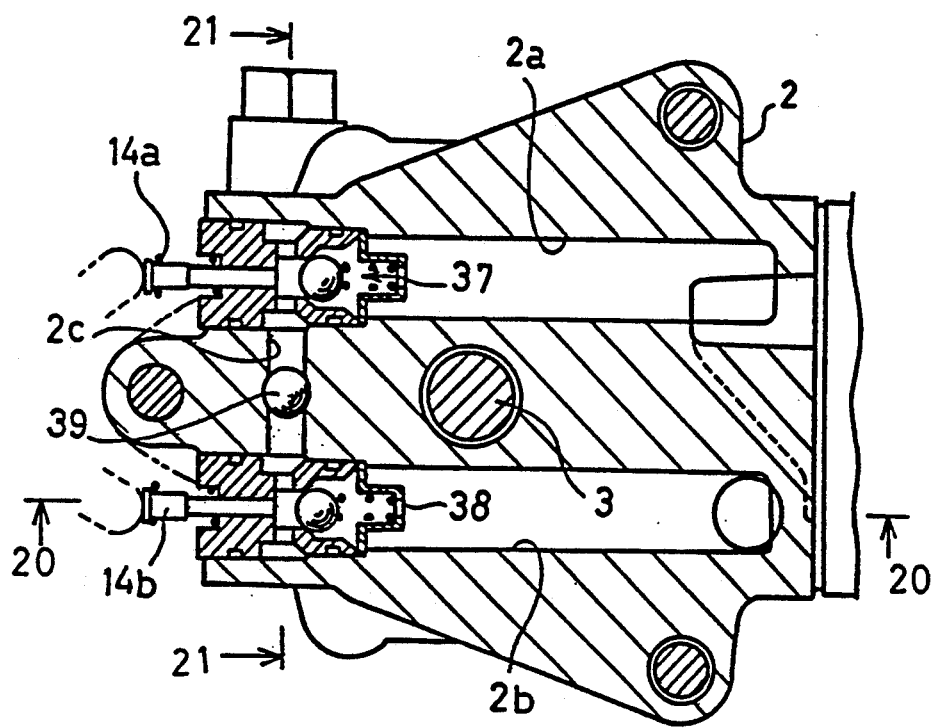
FIG. 18 is a sectional view taken on the line 18—18 in FIG. 16.
Figure 19:
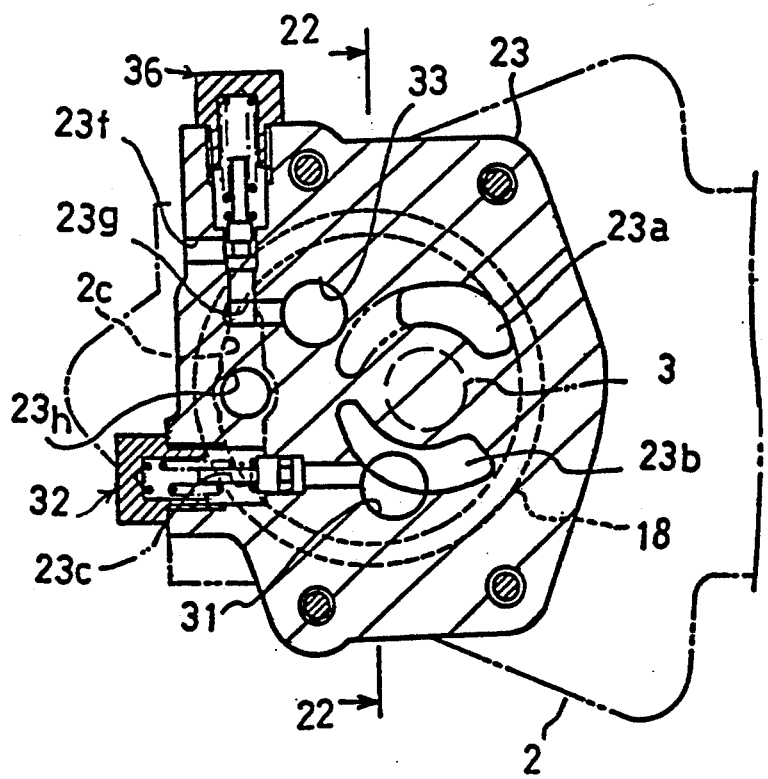
FIG. 19 is a sectional view taken on the line 19—19 in FIG. 16.

Annular filter 25 is interposed between the lower surface of charge pump casing 23 and a bottom all of housing 1. Suction port 23a at charge pump P2, as shown in FIG. 17, is open at the lower surface of charge pump casing 23 and directly connects with the interior of filter 25.

Figure 20:
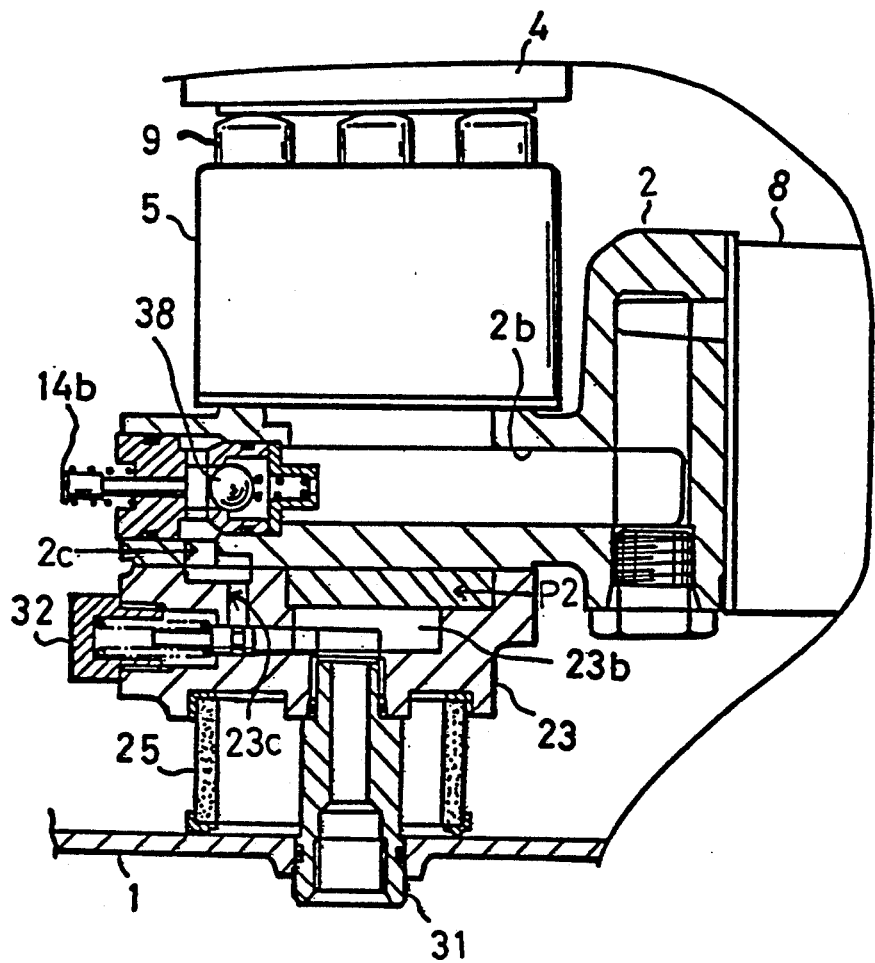
FIG. 20 is a sectional view taken on the line 20—20 in FIG. 18.
Figure 22:
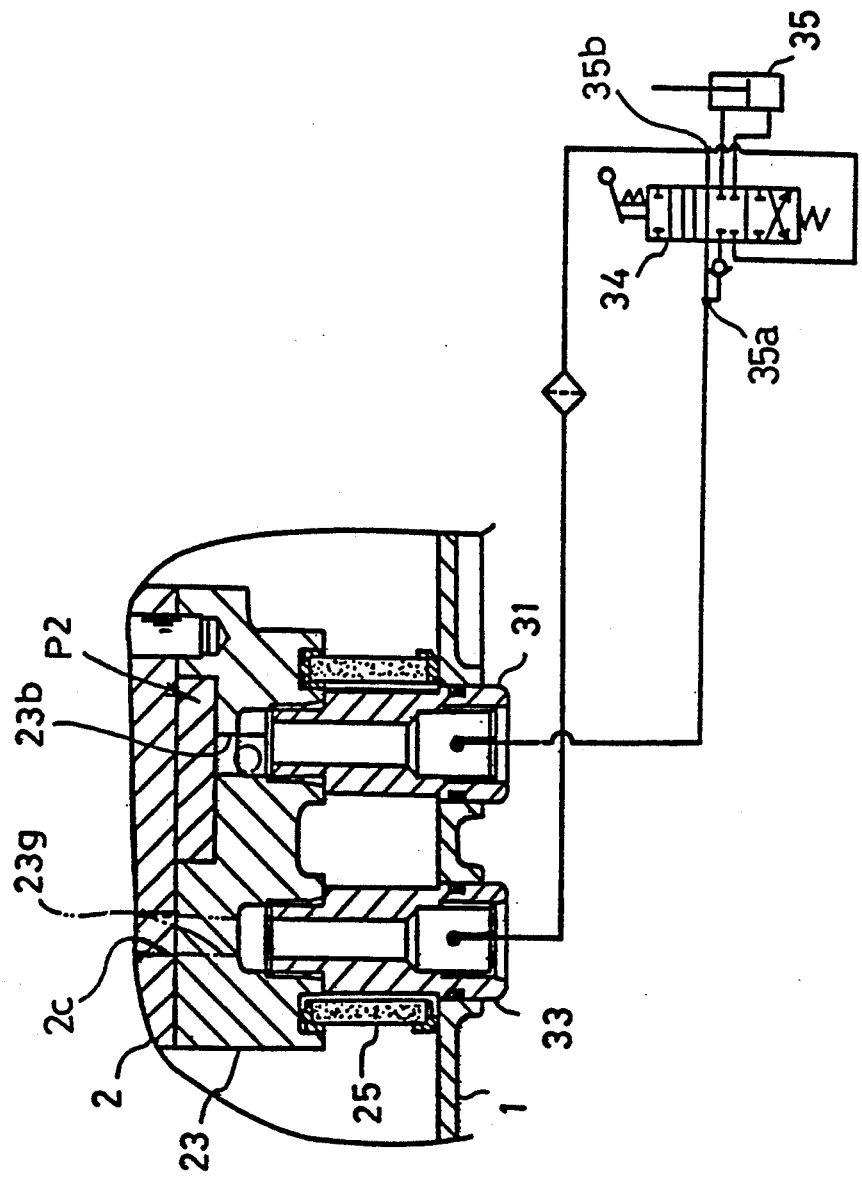
FIG. 22 is a sectional view taken on the line 22—22 in FIG. 19.

Takeout side pipe member 31 connected to discharge port 23b and actuator oil inlet 35a, as shown in FIGS. 20 and 22, perforates filter 25 and exposes its end from the bottom wall. Return oil from actuator 35 and actuator oil outlet 35b flows to oil passage 23g at charge pump casing 23 through a return side pipe member 33 which is disposed in filter 25 and is exposed at the end from the bottom wall of housing 1, the same as pipe member 31, thereby being utilized for charge oil.

Figure 21:
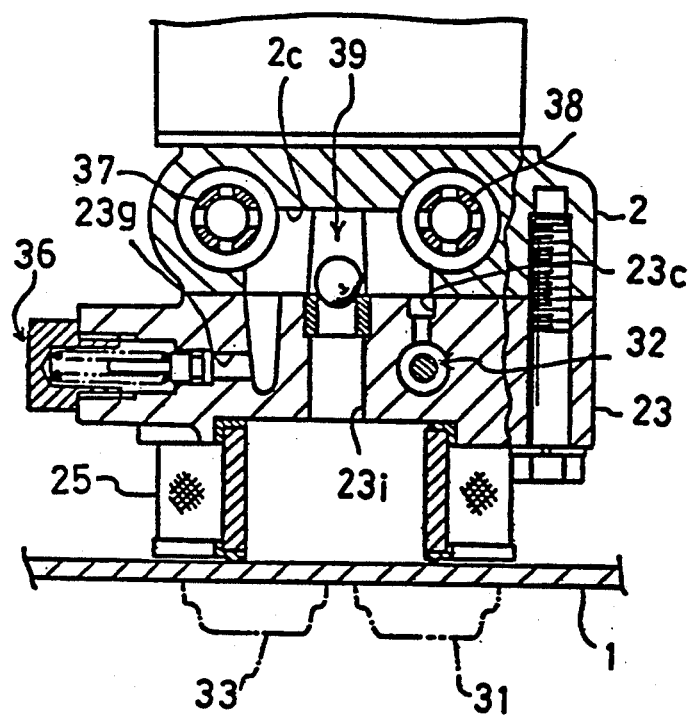
FIG. 21 is a sectional view taken on the line 21—21 in FIG. 18.

As shown in FIG. 21, an open elongate groove 2c is formed at the junction surface of charge pump casing 23 and center section 2. Groove 2C communicates across the pressure oil supply ports with the pair of by-pass check valves 37 and 38. On the other hand, oil passage 23c connecting with the low pressure side of relief valve 32 housed in the charge pump casing 23 and oil passage 23g connecting with the high pressure side of relief valve 36 are open at the junction surface of center section 2 at charge pump casing 23.

Charge pump casing 23 joins with the center section 2, so that the elongate groove 2c functions as an oil passage and is constructed to allow oil passages 23c and 23g to communicate with both ends of groove 2c, thereby allowing simplification in machining the oil passage.

The self-suction check valve 39 described in the first embodiment is also adopted in the third embodiment, which is disposed at about the lengthwise center of the elongate groove 2c, oil passage 23h is open at charge pump casing 23 so that self-suction check valve 39 can take oil into filter 25.

Next, explanation will be given on the construction of a fourth embodiment of the invention in accordance with FIGS. 23 through 30.

A combined hydrostatic transmission and axle driving apparatus, charge pump P2 and filter 25 are the same in construction as those described above in the first embodiment, and therefore are omitted from further explanation. Charge pump casing 23, which is provided with relief valve 32 for adjusting the operating oil pressure of the actuator, a pressure reducing valve 41 for adjusting the charge oil pressure, and a resistance valve 27, are the same as those described above in the second embodiment. Therefore, a further detailed description thereof is also omitted. Those portions which are different in construction from those in the first and second embodiments are described as follows.

In the case where relief valve 32 adjusts to 59 kg/cm$^2$ of oil pressure (for example, if 80 kg/cm$^2$ discharged from charge pump P2, pressure reducing valve 41 adjusts the oil pressure at its low pressure side to be 7 kg/cm$^2$), resistance valve 27 is set at, for example, 5 kg/cm$^2$, lower than that of the low pressure side of valve 41.

Figure 28:
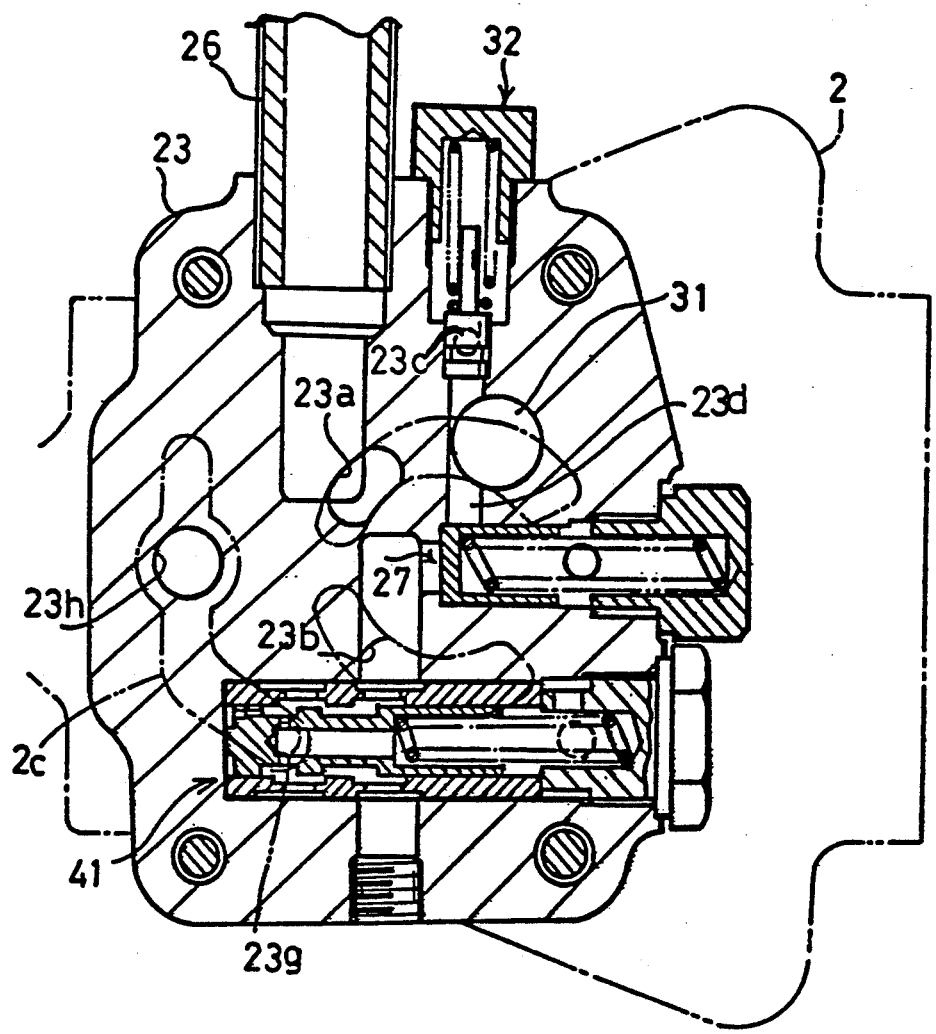
FIG. 28 is a sectional view taken on the line 28—28 in FIG. 24.
Figure 29:
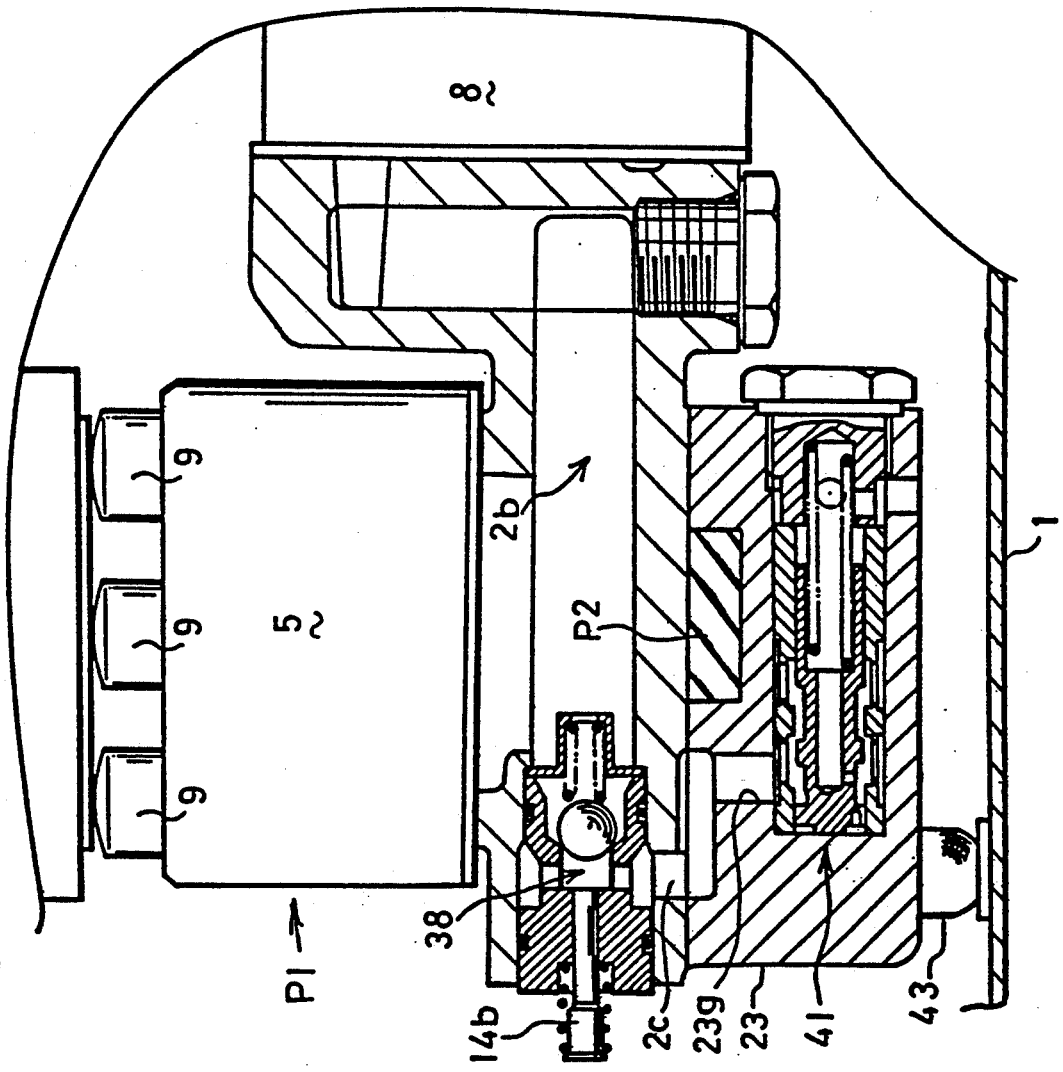
FIG. 29 is a sectional view taken on the line 29—29 in FIG. 27.
Figure 30:
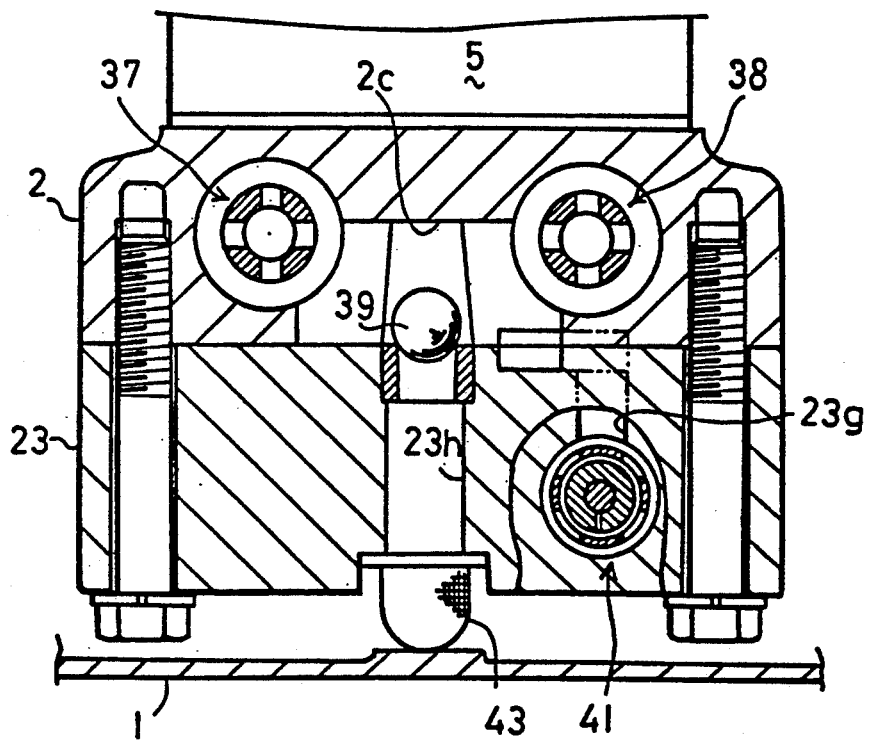
FIG. 30 is a sectional view taken on the line 30—30 in FIG. 27.
Figure 31:
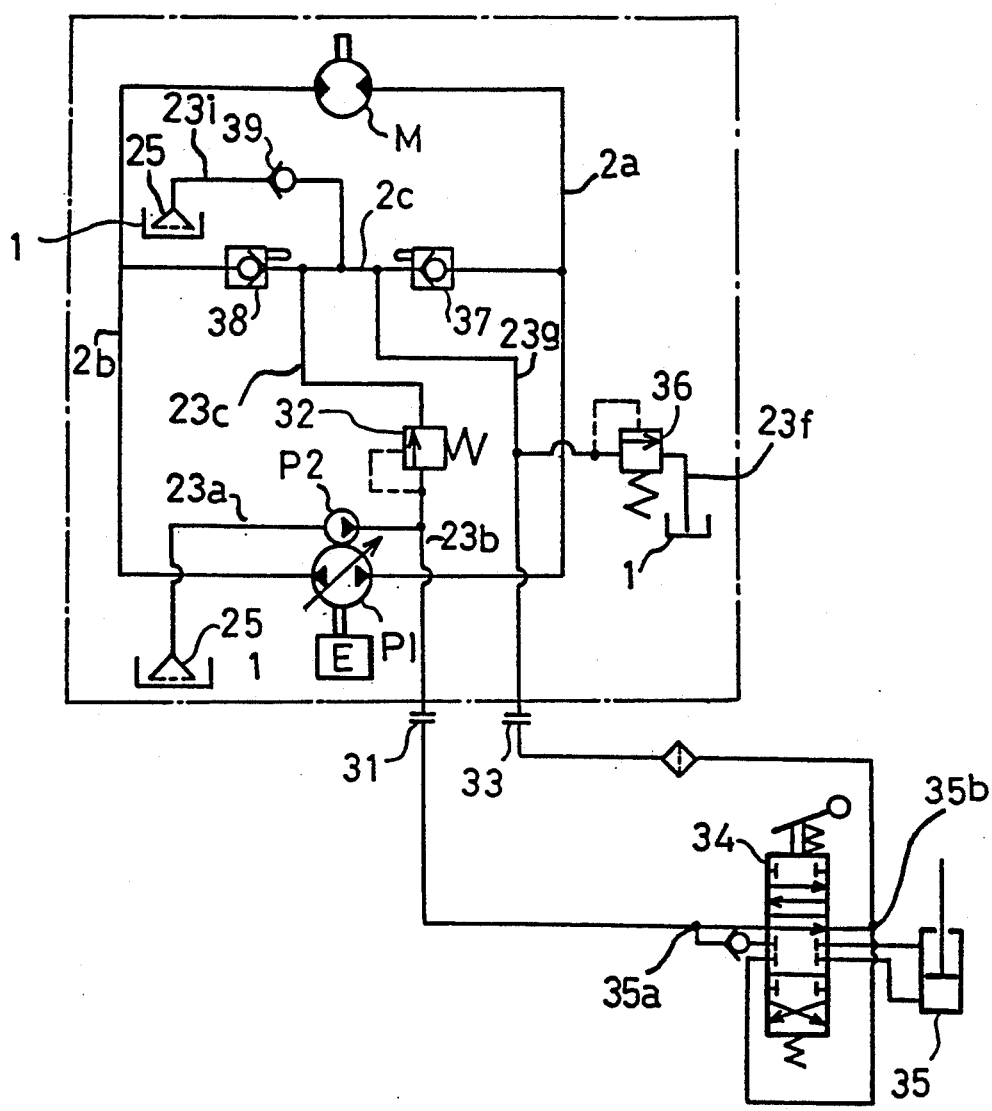
FIG. 31 is a hydraulic circuit diagram, constructed in accordance with the 1st and 3rd embodiments.
Figure 32:
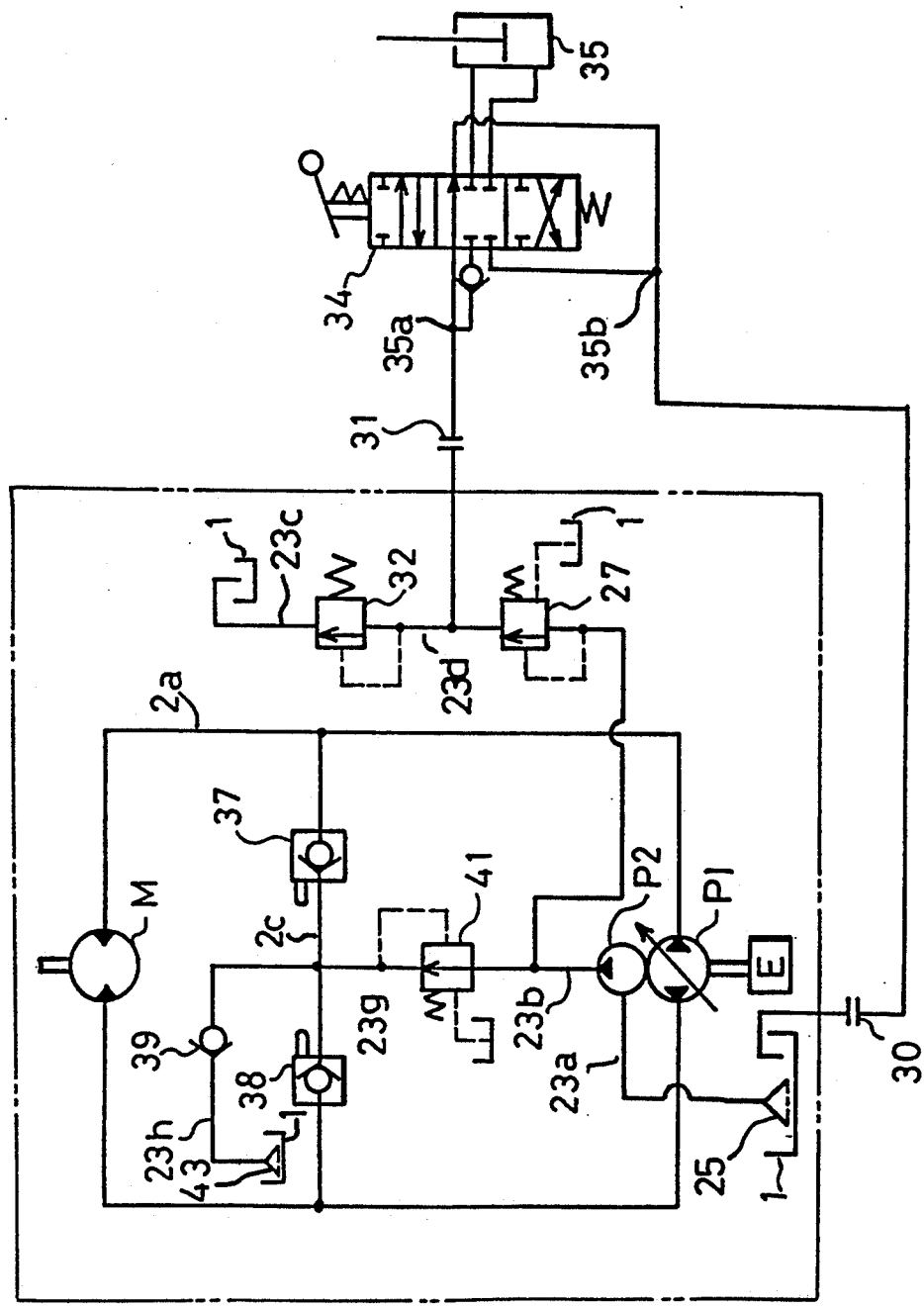
FIG. 32 is a hydraulic circuit diagram constructed in accordance with the 2nd and 4th embodiments.

Accordingly, in the case where actuator 35 is operated, as shown in FIG. 28, pressurized oil discharged from discharge port 23b at the charge pump P2 is adjusted by relief valve 32 to open resistance valve 27 and flows toward a takeout side pipe member 31 (FIG. 26) which is exposed to an end from the bottom wall of housing 1 to the exterior and through actuator oil inlet 35a, thereby actuating actuator 35. Oil from actuator outlet 35b is returned to an oil sump in housing 1 through oil port 30 provided at the upper surface of housing 1.

Simultaneously, the pressurized oil adjusted by relief valve 32 enters into the high pressure side of pressure reducing valve 41 (shown in FIGS. 28 and 29) to adjust the oil pressure of the low pressure side of the same, and flows from oil passage 23g to elongate groove 2c open at the junction surface of center section 2 and then toward the pair of by-pass check valves 37 and 38.

On the other hand, in the case where actuator 35 is not operated, the pressurized oil discharged from the discharge port 23b at charge pump P2 opens resistance valve 27, passes through directional control valve 34, and actuator oil outlet 35b, and returns directly to housing 1 from oil port 30, whereby relief valve 32 does not operate; at which time the operating oil pressure of resistance valve 27 is guided to the high pressure side of pressure reducing valve 41. Since the oil pressure is set lower than the low pressure side of pressure reducing valve 41 as mentioned above, pressure reducing valve 41 is not fully open. Accordingly, the oil pressure having actuated resistance valve 27 serves as the charge oil pressure so that the oil flows to elongate groove 2c, open at the junction surface of center section 2, from oil passage 23g and then toward the pair of by-pass check valves 37 and 38.

As seen from the above, pressure reduction valve 41, which varies between operation and non-operation corresponding to operation and non-operation of actuator 35, can prevent a rise in oil temperature. In addition, self-suction check valve 39 is provided in this embodiment, and is disposed at about the lengthwise center in elongate groove 2c. An oil passage 23h is open at charge pump casing 23 via which self-suction check valve 39 can taken in oil through a filter 43.

Figure 23:
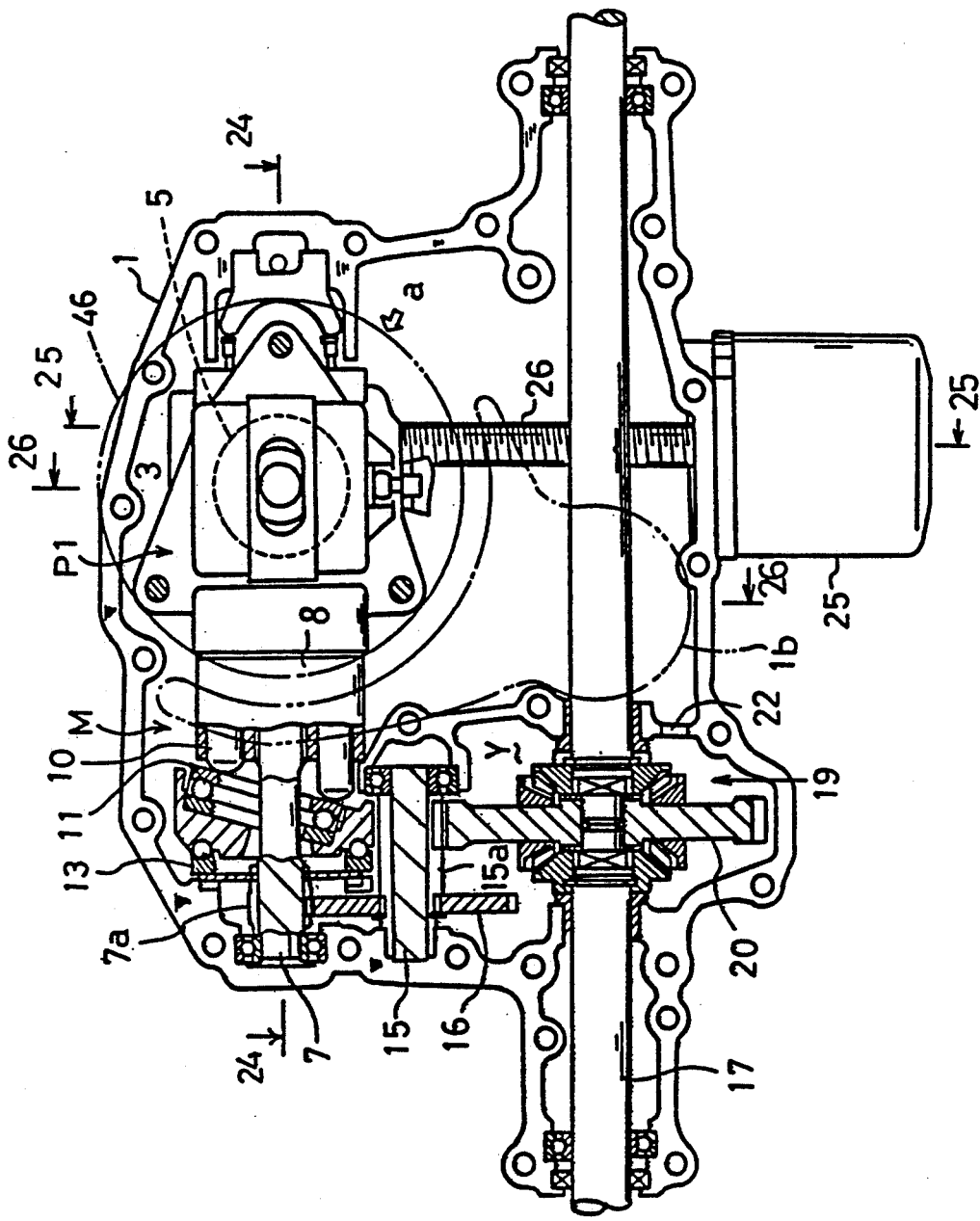
FIG. 23 is a sectional plan view of a fourth embodiment of the axle driving apparatus of the invention, in which the upper housing is removed.
Figure 26:
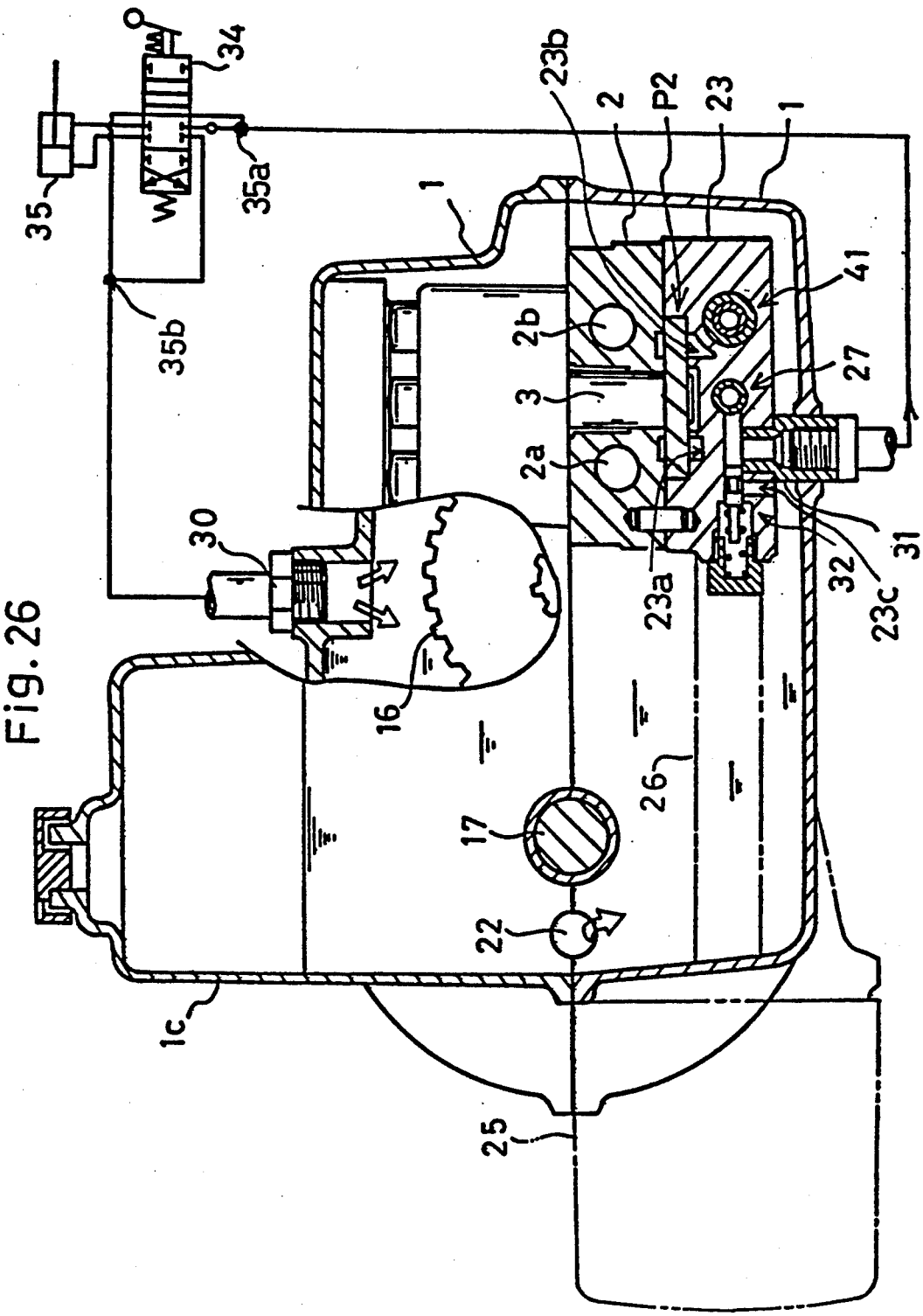
FIG. 26 is a sectional view taken on the line 26—26 in FIG. 23.
Figure 27:
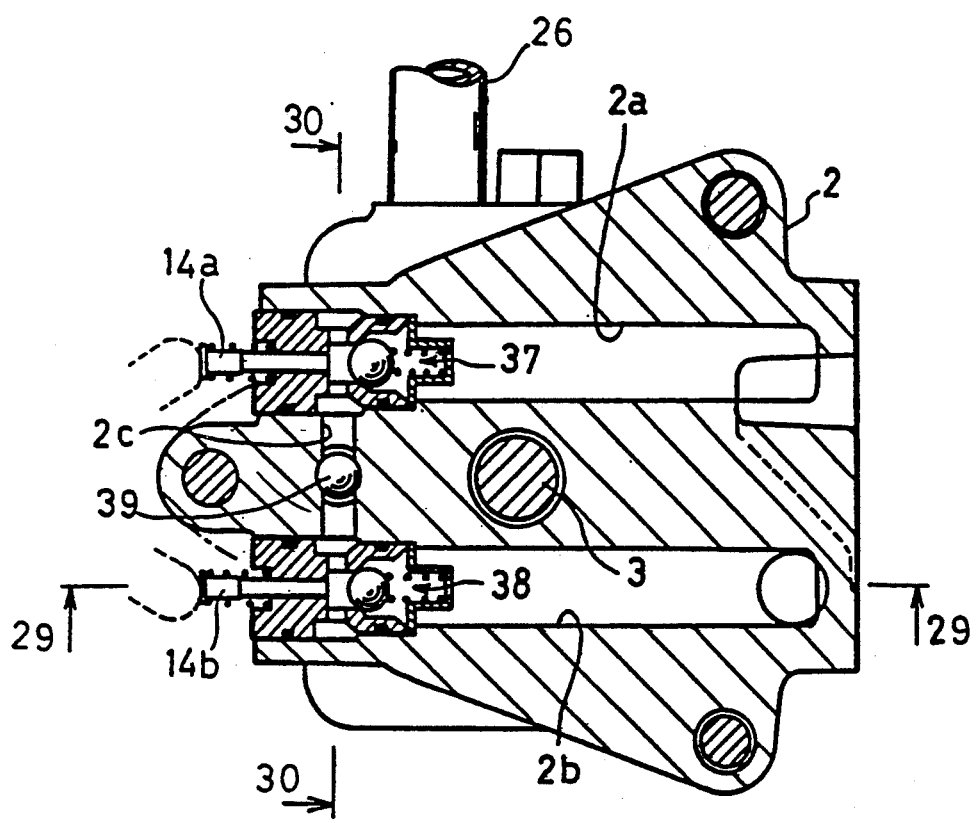
FIG. 27 is a sectional view taken on the line 27—27 in FIG. 24.

As shown in FIG. 23, housing 1 is partitioned therein into two left and right containing rooms or chambers X and Y so that a hydrostatic transmission is housed in room X and a power transmitting means for transmitting power from motor shaft 7 to axle 17 is housed in room Y. Oil port 30, as shown in FIG. 26, is provided in room Y and return oil from actuator oil outlet 35b of actuator 35 is collected into the oil sump thereof.

Figure 24:
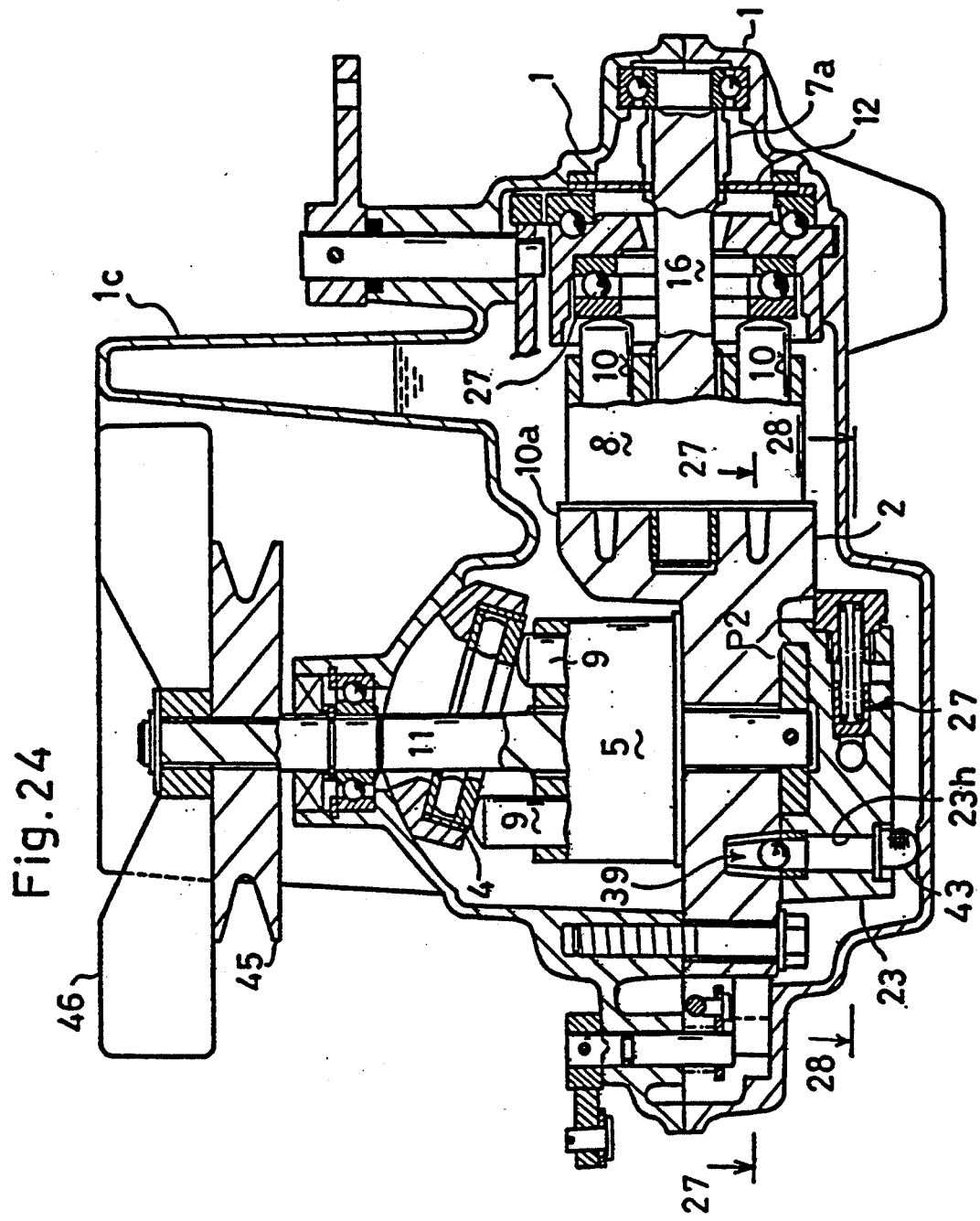
FIG. 24 is a sectional view taken on the line 24—24 in FIG. 23.
Figure 25:
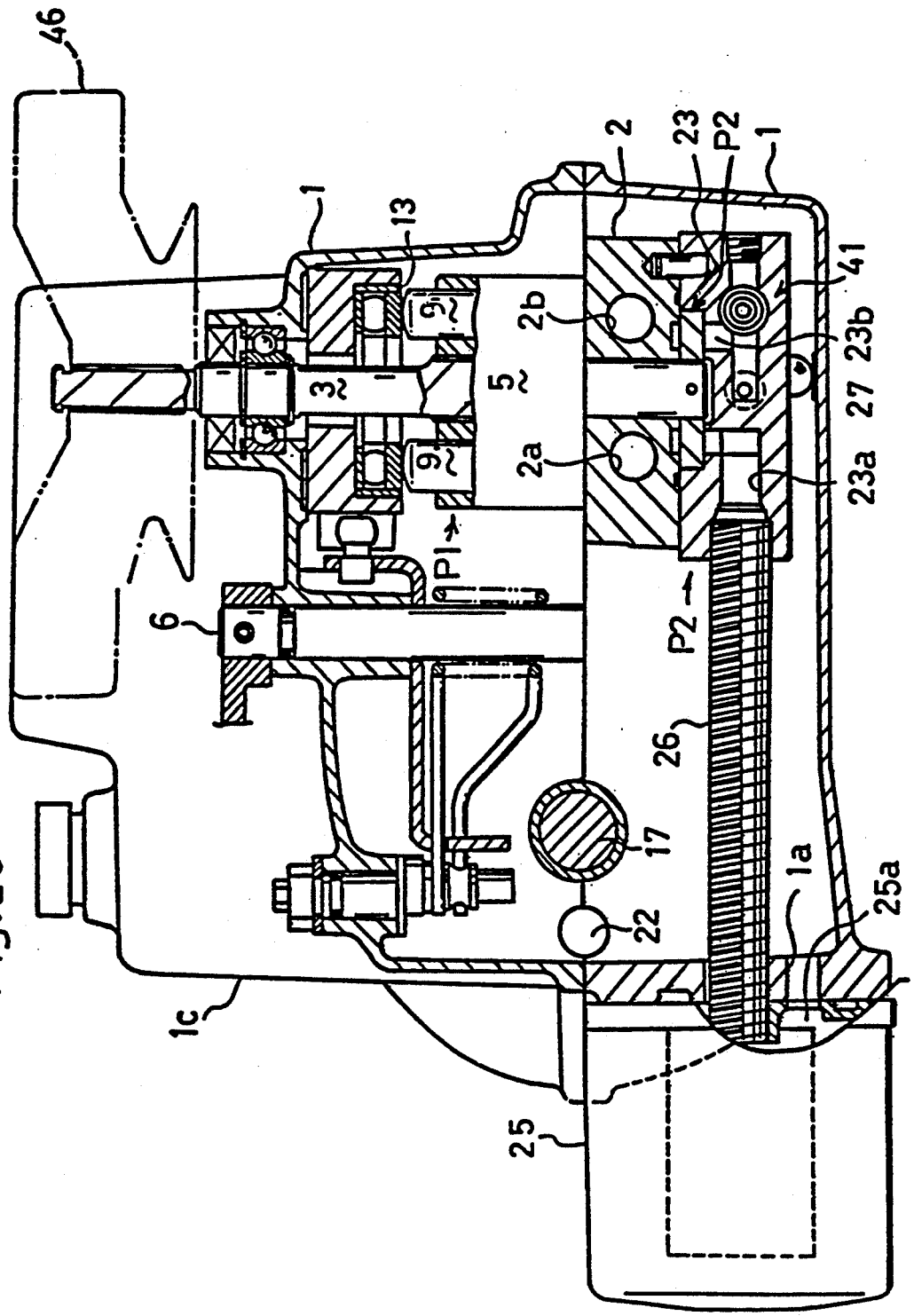
FIG. 25 is a sectional view taken on the line 25—25 in FIG. 23.

An opening 22 is formed in a partition between rooms X and Y so that oil flows from room Y to X through opening 22 and, as shown in FIG. 25, is again taken into filter 25 from a suction port 1a. In addition, along the oil passage and on the upper surface of housing 1 is provided a sub-tank 1c whereby, in the process of flowing oil, air mixed in the oil is separated therefrom toward sub-tank 1c. In addition, sub-tank 1c, as shown in FIG. 24, surrounds cooling fans 46 rotatable by pump shaft 3, thereby improving the oil cooling efficiency in housing 1.

The hydraulic power transmission constructed in accordance with the above-mentioned description has the following advantages. First, the charge pump provided in the housing and formed into the oil sump can supply operating oil to the hydrostatic transmission in the housing and also operate the actuator for an external working machine, whereby, an exclusive pump for operating the actuator is not required. Thus, the transmission is inexpensive to produce. Also, the housing for the hydrostatic transmission is large enough to ensure space for disposing the charge pump therein, thereby enabling the entire hydraulic power transmission to be compact.

Second, to the outer wall of the housing is attached the filter for filtering the oil taken in the housing by the charge pump for the hydrostatic transmission, whereby the filter is easy to change without dismantling the housing. Also, since the charge pump is disposed in the housing, even when oil leaks from the charge pump, the oil does not leak from the housing to the exterior, thereby simplifying the seal construction of the charge pump.

Further, the discharge port of the filter and the suction port of the charge pump are connected to each other through the pipe member, whereby the filtered oil can simply be sent to the charge pump without it mixing with oil in the housing which is not yet filtered.

What is claim is:

1. A hydraulic power transmission comprising:
    a housing;
    a hydrostatic transmission, including an input shaft, disposed in said housing;
    a charge pump, including a suction port, driven by said input shaft of said hydrostatic transmission, disposed in said housing;
    an oil sump formed in said housing;
    a filter attached to an outer wall of said housing, including a discharge port, whereby oil in said oil sump is taken into said filter;
    means disposed within said housing for placing indirect fluid communication said discharge port of said filter with said suction port of said charge pump.

2. A hydraulic power transmission as set forth in claim 1, wherein said means is disposed across the interior of said housing and is attached at one end to said discharge port of said filter and at another end to said suction port of said charge pump.

3. A hydraulic power transmission comprising:
    a housing;
    a hydrostatic transmission disposed in said housing having an oil passage for operating oil, and an input shaft;
    a charge pump disposed in said housing driven by said input shaft of said hydrostatic transmission, said charge pump having a discharge port for discharging oil;
    an actuator disposed outside said housing;
    an actuator oil inlet connected to said actuator, said actuator oil inlet in direct fluid communication with said discharge port of said charge pump;
    an actuator oil outlet connected to said actuator; and
    means disposed within said housing for placing in direct fluid communication said actuator oil outlet with said oil passage of said hydrostatic transmission.

4. A hydraulic power transmission as set forth in claim 3 further comprising:
    a first oil control means disposed in said housing having an inlet and an outlet, said inlet of said first oil control means in fluid communication with both said discharge port of said charge pump and said actuator oil inlet whereby said first oil control means controls operating oil pressure of said actuator and whereby said outlet of said first oil control means is in fluid communication with said oil passage of said hydrostatic transmission.

5. A hydraulic power transmission as set forth in claim 4 further comprising:
    a second oil control means disposed in said housing having an inlet, said inlet of said second oil control means in fluid communication with both said actuator oil outlet and said oil passage of said hydrostatic transmission, whereby said second oil control means controls oil pressure of oil which is discharged by said actuator and which enters said oil passage of said hydrostatic transmission.

6. A hydraulic power transmission as set forth in claim 5 further comprising:

a pump casing disposed in said housing enclosing said charge pump, said first and said second oil control means disposed in said pump casing; and means for providing inlet and outlet fluid communication to and from said actuator projecting from said pump casing and extending through said housing.

7. A hydraulic power transmission according to claim 4, wherein said first oil control means comprises a pressure relief valve.

8. A hydraulic power transmission according to claim 5, wherein said second oil control means comprises a pressure relief valve.

9. A hydraulic power transmission comprising:

a housing including an oil sump;

a housing oil port in said housing for providing a fluid communication path through said housing to said oil sump;

a hydrostatic transmission disposed in said housing having an oil passage for operating oil, and an input shaft;

a charge pump disposed in said housing having a discharge port for discharging oil, and driven by said input shaft of said hydrostatic transmission.

an actuator disposed outside said housing;

an actuator oil inlet connected to said actuator;

means disposed within said housing for placing in direct fluid communication said discharge port of said charge pump with said oil passage of said hydrostatic transmission and with said actuator oil inlet; and an actuator oil outlet connected to said actuator, said actuator oil outlet in fluid communication with said housing oil port wherein discharged oil from said actuator oil outlet is returned to said oil sump in said housing through said housing oil port.

10. A hydraulic power transmission as set forth in claim 9 further comprising:

a first oil control means disposed in said housing in fluid communication with said discharge port of said charge pump and in fluid communication with said actuator oil inlet, whereby said first oil control means controls oil discharged from said discharge port of said charge pump to control operating oil pressure of said actuator; and a second oil pressure control means disposed in said housing having an inlet and an outlet, said inlet of said second oil control means in fluid communication with said discharge port of said charge pump, said outlet of said second oil control means in fluid communication with said oil passage of said hydrostatic transmission whereby said second oil control means controls operating oil charging pressure of said hydrostatic transmission.

11. A hydraulic power transmission as set forth in claim 10 further comprising:

a pump casing disposed in said housing wherein said charge pump, said first oil control means and said second oil control means are disposed within said pump casing.

12. A hydraulic power transmission as set forth in claim 11 further comprising:

means for providing fluid communication between said actuator oil inlet and said discharge port of said charge pump projecting from said pump casing and extending through said housing.

13. A hydraulic power transmission according to claim 10, wherein said first oil control means comprises a pressure relief valve.

14. A hydraulic power transmission according to claim 10, wherein said second oil control means comprises a pressure reducing valve.

15. A hydraulic power transmission as set forth in claim 7, wherein said means comprises a pipe.

16. A hydraulic power transmission according to claim 6, wherein said means for providing inlet and outlet fluid communication comprises first and second pipes.

17. A hydraulic power transmission as set forth in claim 1, wherein said means for providing fluid communication comprises a pipe.

18. A hydraulic power transmission comprising:

a housing including an oil sump;

a hydrostatic transmission disposed in said housing, having an oil passage for operating oil;

an input shaft supported by said housing;

a pump disposed in said housing driven by said input shaft, and having a suction port for receiving oil from said oil sump and a discharge port for discharging oil;

an actuator oil inlet disposed in said housing for supplying operating oil to an actuator;

means disposed within said housing for controlling oil discharged from said discharge port of said pump and for supplying oil to said oil passage of said hydrostatic transmission and to said actuator oil inlet.

19. A hydraulic power transmission according to claim 18, wherein said means comprises:

a first oil control means for controlling the operating oil pressure of said actuator; and a second oil control means for controlling the operating oil charging pressure of said hydrostatic transmission.

20. A hydraulic power transmission as set forth in claim 19 further comprising:

a pump casing disposed in said housing wherein said charge pump, said first oil control means and said second oil control means are disposed within said pump casing.

21. A hydraulic power transmission comprising:

a housing;

a hydrostatic transmission disposed in said housing having an oil passage for operating oil, and an input shaft;

an oil sump formed in said housing;

a filter including a discharge port, whereby oil in said oil sump is taken into said filter;

a charge pump having a suction port for receiving oil from said discharge port of said filter and a discharge port for discharging oil, said charge pump driven by said input shaft of said hydrostatic transmission;

an actuator disposed outside said housing;

an actuator oil inlet disposed in said housing for supplying operating oil to said actuator; and means disposed in said housing for controlling oil discharged from said discharge port of said charge pump and for supplying oil to said oil passage of said hydrostatic transmission and to said actuator oil inlet.

22. A hydraulic power transmission as set forth in claim 21 further comprising:

a pump casing disposed within said housing, wherein said charge pump and said means for controlling oil are disposed within said pump casing.

23. A hydraulic power transmission according to claim 21, wherein said filter is disposed within said housing, and wherein said discharge port of said filter is in direct fluid communication with said suction port of said charge pump.

24. A hydraulic power transmission according to claim 21, wherein said filter is attached to an outer wall of said housing, whereby said discharge port of said filter is in fluid communication with said suction port of said charge pump.

* * * * *